United States Patent [19]
Kawagoe et al.

[11] Patent Number: 5,308,948
[45] Date of Patent: May 3, 1994

[54] METHOD FOR WELDING TOGETHER ELECTRICALLY CONDUCTIVE MEMBERS

[75] Inventors: Tadashi Kawagoe, Hekinan; Keizo Zyouko, Okazaki; Shinzo Ito, Aichi, all of Japan

[73] Assignee: Nippondenso Co., Ltd., Kariya, Japan

[21] Appl. No.: 9,929

[22] Filed: Jan. 27, 1993

[30] Foreign Application Priority Data

Jan. 28, 1992 [JP] Japan .................. 4-012971
May 22, 1992 [JP] Japan .................. 4-130651

[51] Int. Cl.⁵ .......................................... B23K 11/24
[52] U.S. Cl. ................................. 219/110; 219/56; 219/91.21
[58] Field of Search ................... 219/56, 91.21, 110

[56] References Cited

U.S. PATENT DOCUMENTS

| 3,538,293 | 11/1970 | Procacino | 219/56 |
| 4,072,843 | 2/1978 | Szabo | 219/91.21 |
| 4,876,430 | 10/1989 | Herschitz et al. | 219/110 |
| 4,963,707 | 10/1990 | Zyokou et al. | |

FOREIGN PATENT DOCUMENTS

| 1378650 | 12/1974 | United Kingdom |
| 1386105 | 3/1975 | United Kingdom |
| 2096039 | 10/1982 | United Kingdom |
| 2232013 | 11/1990 | United Kingdom |

Primary Examiner—Clifford C. Shaw
Attorney, Agent, or Firm—Cushman, Darby & Cushman

[57] ABSTRACT

A method for welding together electrically conductive members, comprises detecting step for detecting a removal of an electrically insulating member between a first electrically conductive member and a second electrically conductive member, and welding step for welding together the first electrically conductive member and the second electrically conductive member by an electricity through them to be fixed to each other, after the removal of the electrically insulating member therebetween is detected.

44 Claims, 17 Drawing Sheets

F I G. 5
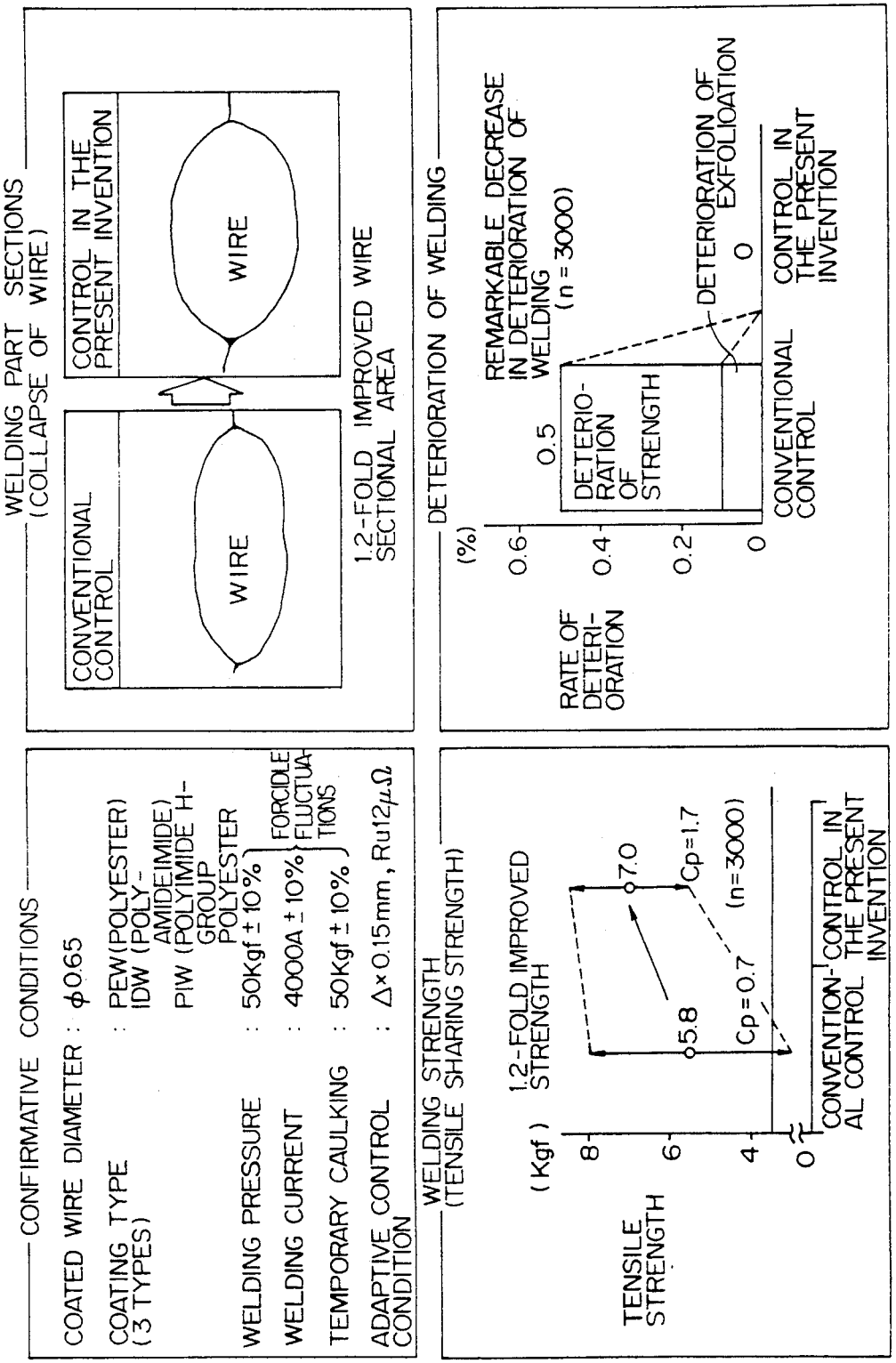

ically conductive members. Further, the higher the temperature of the first and second electrically conductive members is, the larger the value of electric resistance therethrough is.

METHOD FOR WELDING TOGETHER ELECTRICALLY CONDUCTIVE MEMBERS

BACKGROUND OF THE INVENTION AND RELATED ART STATEMENT

The present invention relates to a method for welding together electrically conductive members with an electrically insulating member therebetween.

In a conventional method for welding together the electrically conductive members with the electrically insulating member therebetween, an electric current value for energizing electrically the electrically conductive members to be welded together, a timing and period for applying the electric current to the electrically conductive members and a force for pressing the electrically conductive members against each other and compressing the electrically insulating member therebetween are fixed constantly or not adjusted in a welding process.

OBJECT AND SUMMARY OF THE INVENTION

An object of the present invention is to provide a method for welding together electrically conductive members with an electrically insulating member therebetween, by which method the electrically insulating member can be removed securely therebetween, and a heat energy for welding together the electrically conductive members can be kept at an appropriate degree.

According to the present invention, a method for welding together electrically conductive members, comprises detecting step for detecting a removal of an electrically insulating member between a first electrically conductive member and a second electrically conductive member, and welding step for welding together the first electrically conductive member and the second electrically conductive member by an electricity through them to be fixed to each other, after the removal of the electrically insulating member therebetween is detected.

In the present invention, since the first electrically conductive member and the second electrically conductive member are welded together by the electricity through them to be fixed to each other after the removal of the electrically insulating member therebetween is detected, the electrically insulating member does not remain therebetween after the first electrically conductive member and the second electrically conductive member are welded together, and an electric conductivity between first electrically conductive member and the second electrically conductive member is sufficient for an appropriate welding electric current so that the heat energy for welding together the electrically conductive members is supplied to them securely and the first electrically conductive member and the second electrically conductive member are securely welded together. Further, since the removal of the electrically insulating member is detected between the first and second electrically conductive members, a positional relation therebetween may be substantially constant in both of the detecting and welding steps, or a contact therebetween through the electrically insulating member may be kept in both of the detecting and welding steps.

The removal of the electrically insulating member may be detected from in increase (including a start of increase) in temperature of at least one of the first and second electrically conductive members, because the temperature of at least one of the first and second electrically conductive members is increased by an ohmic resistance heating through the first and second electrically conductive members when the electrically insulating member is removed at least partially by a heat energy and/or compressing force applied thereto from at least one of the first and second electrically conductive members so that a direct contact or substantial electric conduction between the first and second electrically conductive members is generated, or because the electrically insulating member is made easily movable or removed by the increase in temperature of at least one of the first and second electrically conductive members when the electrically insulating member is thermoelastic or thermovaporizable. The increase in temperature may be measured from an increase in electric resistance (including a start of increase thereof) through the first and second electrically conductive members, or alternatively, the increase in temperature may be measured from a temperature of a surface of the at least one of the first and second electrically conductive members through a surface temperature sensor. The increase in temperature may be a difference between a certain temperature and am actual temperature or an increase to an absolute temperature.

The removal of the electrically insulating member may be detected from an decrease (including a start of decrease) in electric resistance through the first and second electrically conductive members, because the electric resistance through the first and second electrically conductive members is decreased by the removal of the electrically insulating member or by the direct contact between the first and second electrically conductive members. The decrease in electric resistance may be a difference between a certain electric resistance and an actual electric resistance, or a decrease to an absolute electric resistance.

The removal of the electrically insulating member may be detected from an evaporative gas from the electrically insulating member which is heated in the detecting step, because the electrically insulating member is elastic or easily movable to be removed between the first and Second electrically conductive members when the electrically insulating member is vaporized, or because the removal of the electrically insulating member is performed by a vaporization thereof.

The removal of the electrically insulating member may be performed by a force compressing the electrically insulating member between the first and second electrically conductive members or a heat energy applied to the electrically insulating member.

The removal of the electrically insulating member may be detected from a temperature of at least one of the first and second electrically conductive members more than a predetermined temperature sufficient for making the electrically insulating member soft or movable for being removed between the first and second electrically conductive members. The temperature thereof is measured from a value of electric resistance through the first and second electrically conductive members, because the higher the temperature of the first and second electrically conductive members is, the larger the value of electric resistance therethrough is. The temperature thereof is measured from the temperature of the surface of the at least one of the first and Second electrically conductive members through the surface temperature sensor.

The removal of the electrically insulating member may be detected from an electric resistance value through the first and second electrically conductive members less than a predetermined value, because the electric resistance value decreases to less than the predetermined value when the electrically insulating member is removed at least partially or the first and second electrically conductive members contact directly with each other at least partially to form an electrical conduction therebetween.

The removal of the electrically insulating member may be detected from a direct contact (including a start of direct contact) between the first and second electrically conductive members, the direct contact may be detected from an increase in temperature of at least one of the first and second electrically conductive members energized to be heated by an electricity made flow through them by the direct contact, or may be detected from an decrease in electric resistance through the first and second electrically conductive members, which decrease is caused by the direct contact.

The removal of the electrically insulating member may detected from a direct contact area between the first and second electrically conductive members more than a predetermined area causing an electrical conduction therebetween sufficient for allowing a sufficient welding electric current. The direct contact area more than the predetermined area may detected from an decrease in electric resistance value through the first and second electrically conductive members more than a predetermined value, a difference between an actual electric resistance value and a certain actual electric resistance value or to a decrease to an absolute electric resistance value.

In the detecting step, at least one of the first and second electrically conductive members may be electrically energized to generate a heat energy for heating the electrically insulating member before the removal of the electrically insulating member is detected, or alternatively, both of the first and second electrically conductive members may be prevented by the electrically insulating member from being electrically energized and the electrically insulating member is compressed between the first and second electrically conductive members, before the removal of the electrically insulating member is detected.

The removal of the electrically insulating member may be detected from a time which is more than a predetermined time and in which a temperature of at least one of the first and second electrically conductive members more than a predetermined temperature sufficient for removing the electrically insulating member is kept.

The removal of the electrically insulating member is detected from a time which is more than a predetermined time and in which a decrease in electric resistance value through the first and second electrically conductive members more than a predetermined degree allowing an electric current sufficient for welding is kept.

The electrically insulating member may be thermoelastic or thermoplastic for being removed between the first and second electrically conductive members when at least one of the first and second electrically conductive members is heated. An evaporative gas may be generated from the electrically insulating member when the electrically insulating member is heated at more than a predetermined temperature or melting or vaporizing temperature thereof. An electric resistance of each of the first and second electrically conductive members may increase according to an increase in temperature thereof.

A force for compressing the electrically insulating member between the first electrically conductive member which is prevented by the electrically insulating member from being energized electrically in the detecting step and the second electrically conductive member which is energized electrically in the detecting step may be decreased after the removal of the electrically insulating member is detected. A force for compressing the electrically insulating member between the first and second electrically conductive members both of which are prevented by the electrically insulating member from being energized electrically during the detecting step may be increased after the removal of the electrically insulating member is detected.

An electrical energizing of at least one of the first and second electrically conductive members may be weakened and/or stopped temporarily between the detecting step and the welding step.

The removal of the electrically insulating member may be detected from an increase in temperature of at least one of the first and second electrically conductive members in comparison with the substantially minimum temperature thereof in the detecting step. The removal of the electrically insulating member may be detected from a decrease in electric resistance through the first and second electrically conductive members in comparison with the substantially maximum electric resistance therethrough in the detecting step. The removal of the electrically insulating member may be detected from an increase in electric resistance value through the first and second electrically conductive members in comparison with the substantially minimum electric resistance value therethrough in the detecting step. The removal of the electrically insulating member may be detected from an increase in direct contact area between the first and second electrically conductive members in comparison with the detected substantially minimum direct contact area therebetween in the detecting step.

The welding step may be finished when a width (W in FIGS. 1 and 6) through the first and second electrically conductive members is decreased to a predetermined or desirable width. The welding step may be finished when a width (W in FIGS. 1 and 6) through the first and second electrically conductive members is decreased by a predetermined degree relative to a width therethrough measured when a start of direct contact between the first and second electrically conductive members is detected. The welding step may be finished when a predetermined heat energy value is applied t# the first and second electrically conductive members to be welded together.

BRIEF DESCRIPTION OF THE DRAWINGS

FIG. 5 is an explanatory diagram for comparing a section of a welding part, a welding strength and a deterioration in welding in the first embodiment described above with those in the prior art;

DESCRIPTION OF THE PREFERRED EMBODIMENTS

Figure 1:
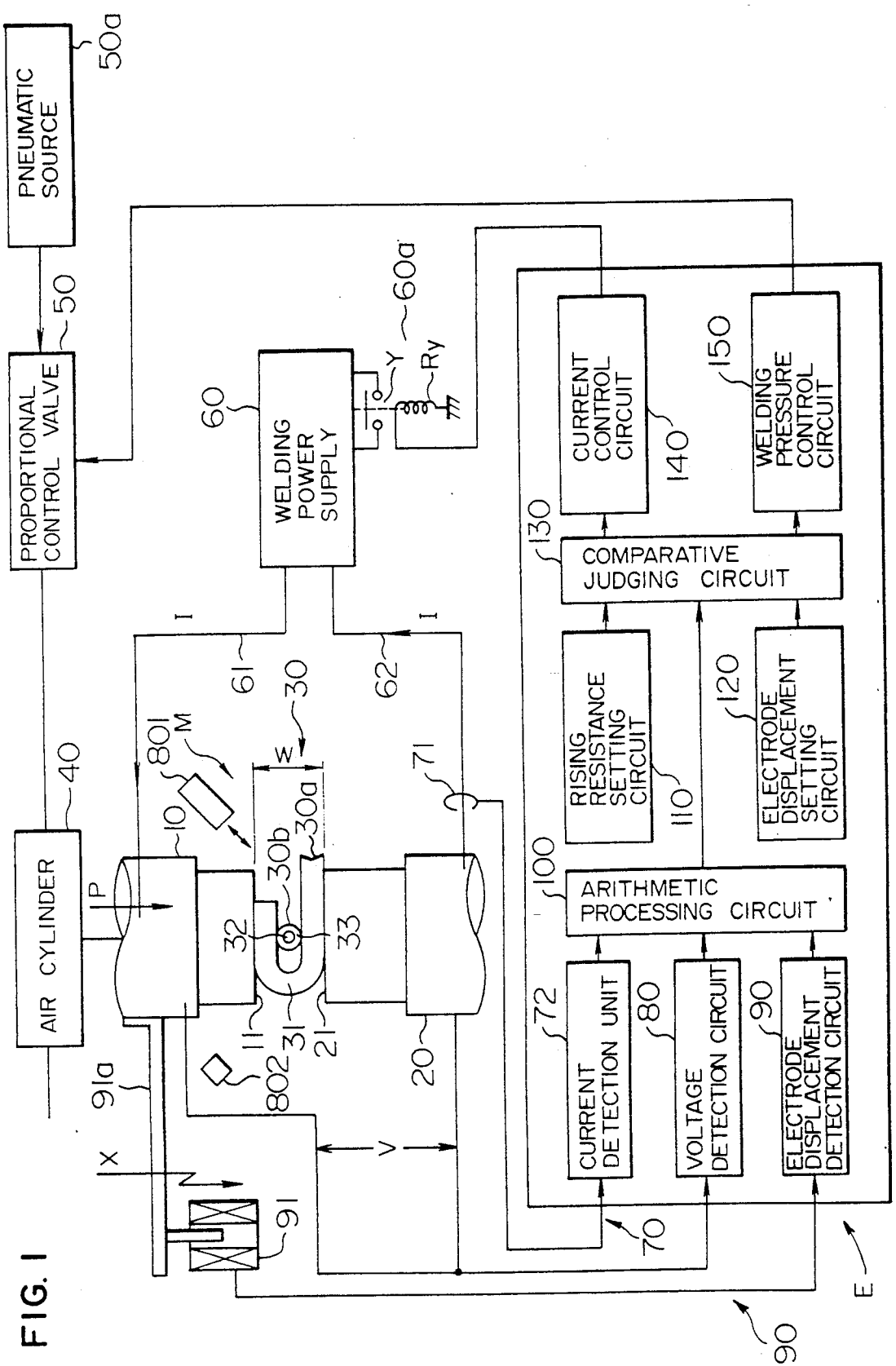
FIG. 1 is a whole schematic block diagram showing a first embodiment of the present invention.

A first embodiment of the present invention will hereinafter be described with reference to the drawings. FIG. 1 illustrates an example where the present invention is applied to a double electrode type resistance welding machine M. This double electrode type resistance welding machine M includes an upper electrode 10 and a lower electrode 20 (both are composed of tungsten, etc.) that are disposed in up-and-down relationship to confront each other. The upper electrode 10 has its pressurizing surface 11. The pressurizing surface 11 depresses a welded material 30 consisting of a terminal 30a mounted on a mounting surface 21 of the lower electrode 20 and a coated wire 30b. Resistance welding is applied to the welded material 30 in accordance with a welding current flowing from the upper electrode 10 across the welded material 30 to the lower electrode 20. The terminal 30a of the welded material 30 is composed of a material such as a cooper alloy or cooper. A tip part 31 of this terminal 30a is bent in a U-shape as a bent part. Further, the coated wire 30b is formed by coating a wire 32 annularly with a coating 33 consisting of a thermoplastic and/or thermally vaporizable insulating material such as polyester, etc. A tip part of this coated wire 30b undergoes the resistance welding and is, as illustrated in FIG. 1, orthogonally inserted into the U-shaped bent part 31 of the terminal 30a.

Next, a control unit E for the resistance welding by the resistance welding machine M will be explained. This control unit E includes an, air cylinder 40 and a proportional control valve 50. The air cylinder 40 moves down the upper electrode 10 in accordance with an air flow pressure-fed via the proportional control valve 50 from a pneumatic source 50a. A welding pressure is thereby applied to the bent part 31 of the terminal 30a from above in the FIG. 1. The proportional control valve 50 controls a quantity of the air flow pressure-fed to the air cylinder 40 from the pneumatic source 50a. This control is effected in accordance with a valve opening based on the proportional control by a welding pressure control circuit 150 which will be mentioned later. A welding power supply 60 is connected via power supply supply conductors 61, 62 to the upper electrode 10 and the lower electrode 20 as well. This welding power supply 60 flows a sine wave welding current at 60 (Hz) through the power supply conductor 61, the upper electrode 10, the welded material 30 and the lower electrode 20. In such a case, the welding power supply 60 includes a relay 60a consisting of a relay coil Ry and a normally open relay switch Y. This relay 60a acts to output the welding current from the welding power supply 60 on closing the relay switch Y due to an excitation of the relay coil Ry on one hand. The relay 60a acts to stop outputting the welding current from the welding power supply 60 on opening the relay switch Y due to a demagnetization of the relay coil Ry on the other hand.

A welding current detection circuit 70 is constructed of a current detection coil 71 and a current detection unit 72. The current detection coil 71 detects a welding current (hereinafter called a welding current I) flowing through the power supply conductor 62. The current detection coil 71 thereby generates a differential detection signal having a differential waveform of the welding current I. The current detection unit 72 is composed of an integration circuit and an amplifier. This current detection unit 72 causes the integration circuit to integrate the differential detection signal from the current detection coil 71. A result of this integration is amplified by the amplifier and outputted as a detected welding current. A voltage detection circuit 80 detects and amplifies an inter-electrode voltage (hereafter referred to as an inter-electrode voltage V) generated between the upper electrode 10 and the lower electrode 20. The voltage detection circuit 80 then generates the voltage as an inter-electrode detected voltage. A displacement quantity detection circuit 90 includes a differential transformer 91 and an electrode displacement quantity detection unit 92 having an amplifier. The differential transformer 91 is connected via its arm 91a to the upper electrode 10. While on the other hand, this displacement quantity detection circuit 90 causes the differential transformer 981 to detect a down-shift quantity of the arm 91a which corresponds to a down-shift quantity of the upper electrode 10 from an up-shift end. This down-shift quantity is amplified and outputted as an electrode displacement quantity (hereafter called an electrode displacement quantity X) by means of the displacement quantity detection unit 92.

An arithmetic processing circuit 100 effects, when actuated, an arithmetic process to increase a welding pressure P on the welded material 30 up to a value required for exfoliating the coating of the coated wire 30b. With an end of stepping up the welding pressure P, the arithmetic processing circuit 100 performs the arithmetic needed for outputting the welding current I from the welding power supply 60. Thereafter, the arithmetic processing circuit 100 computes effective current and voltage values IRMS, VRMS thereof on the basis of the detected welding current given from the welding current detection circuit 70 and the inter-electrode voltage given from the voltage detection circuit 80 per sampling timing cycle. Based on the two effective values IRMS, VRMS, the circuit 100 computes an inter-electrode resistance R (=VRMS/IRMS) between the upper electrode 10 and the lower electrode 20. Simultaneously, the circuit 100 compares two continuous inter-electrode resistances among the inter-electrode resistances R. The circuit 100 sequentially selects the smaller of the two electrode resistances thus compared. Selected further is the electrode displacement quantity X from the displacement quantity detection circuit 90 that corresponds to each selected inter-electrode resistance R.

Further, upon reaching the minimum value of the latest or last-measured or most-newly measured selected inter-electrode resistance R, the arithmetic processing circuit 100 determines the same latest selected inter-electrode resistance R as a minimum resistance Rmin. Besides, the latest electrode displacement quantity X corresponding to the minimum resistance Rmin is determined as a minimum displacement quantity Xmim. Thereafter, the circuit 100 computes a rising resistance RU from the minimum resistance Rmin per sampling timing cycle on the basis of the inter-electrode resistance R. The circuit re-computes the electrode displacement quantity X given afterward from the displacement quantity detection circuit 90 as an electrode displacement quantity X on the basis of the minimum displacement quantity Xmin. A rising resistance setting circuit 110 sets a rising resistance RUO which will be mentioned later. An electrode displacement quantity setting circuit 120 sets an electrode displacement quantity Xo which will hereafter be stated.

By the way, the following is a reason why concepts of the inter-electrode resistance R, the electrode displacement quantity X, the minimum resistance Rmin and each rising resistance RU are, as described above, introduced into the arithmetic operation by the arithmetic processing circuit 100. There will be also elucidated a reason why concepts of the set rising resistance RUO set by the rising resistance setting circuit 110 and the set electrode displacement quantity Xo set by the electrode displacement quantity setting circuit 120 are introduced into the arithmetic operation. The present inventors repeatedly performed a variety of tests about the resistance welding between the coated wire and the terminal. The inventors proved that when the following resistance welding is to be conducted, a reliability on the resistance welding quantity can be remarkably improved by obviating the drawbacks described above. To start with, the inventors examined how the resistance (i.e., the inter-electrode resistance R) between the upper and lower electrodes varies in the course of the resistance welding when a good resistance welding quality between the coated wire and the terminal is obtained. This inter-electrode resistance R turned out to exhibit a concave-like variation tendency as shown in the left half of a characteristic curve La in FIG. 2 as well as in FIG. 3. This resistance R also turned out to have the minimum resistance Rmin. In such a case, the fact that the inter-electrode resistance R increases after reaching the minimum resistance value Rmin is derived from the following reason. The minimum resistance value decreases as the coating exfoliation proceeds and the contact area between the upper electrode and the terminal increases with a progression of pressurization after being energized with electricity. The decrease in the inter-electrode resistance R down to the minimum resistance value Rmin is accompanied by increments both in the energizing current and in temperatures of the two electrodes 10, 20. This leads to a rise in each internal resistance of the two electrodes 10, 20. The inter-electrode resistance R rises from the minimum resistance value Rmin. This is the reason why the inter-electrode resistance R increases after reaching the minimum resistance Rmin.

Figure 2:
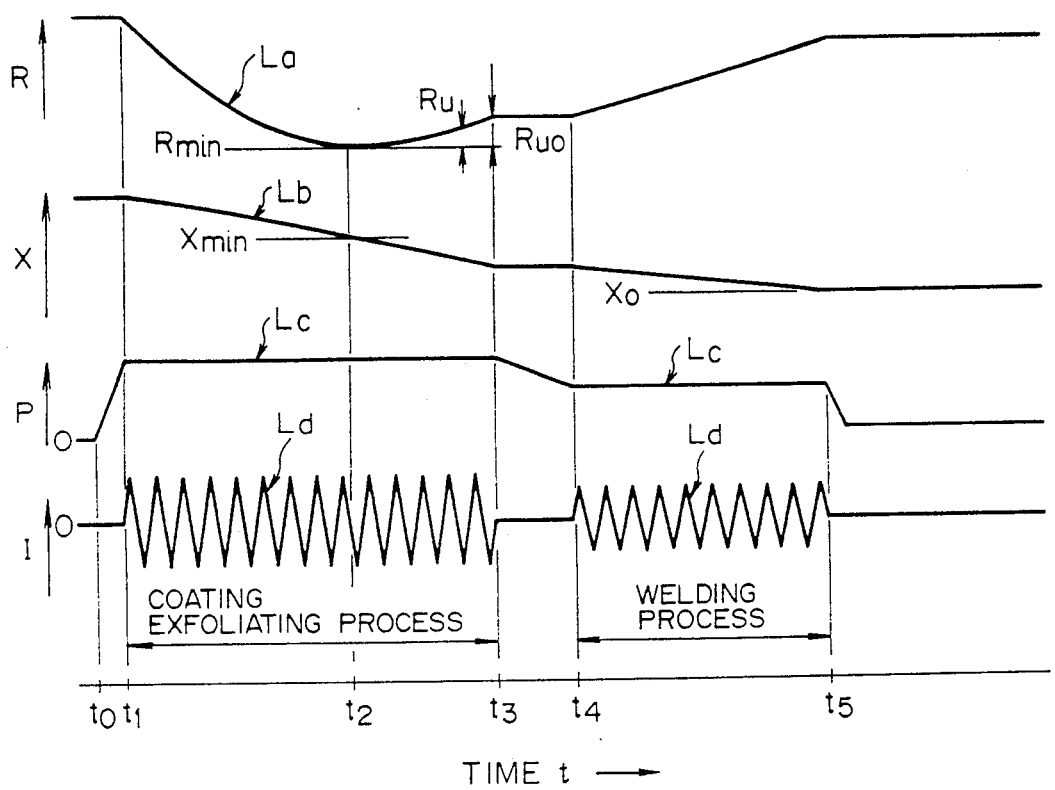
FIG. 2 is a time chart illustrating an inter-electrode resistance R, an electrode displacement quantity X, a welding pressure P and a welding current I.
Figure 3:
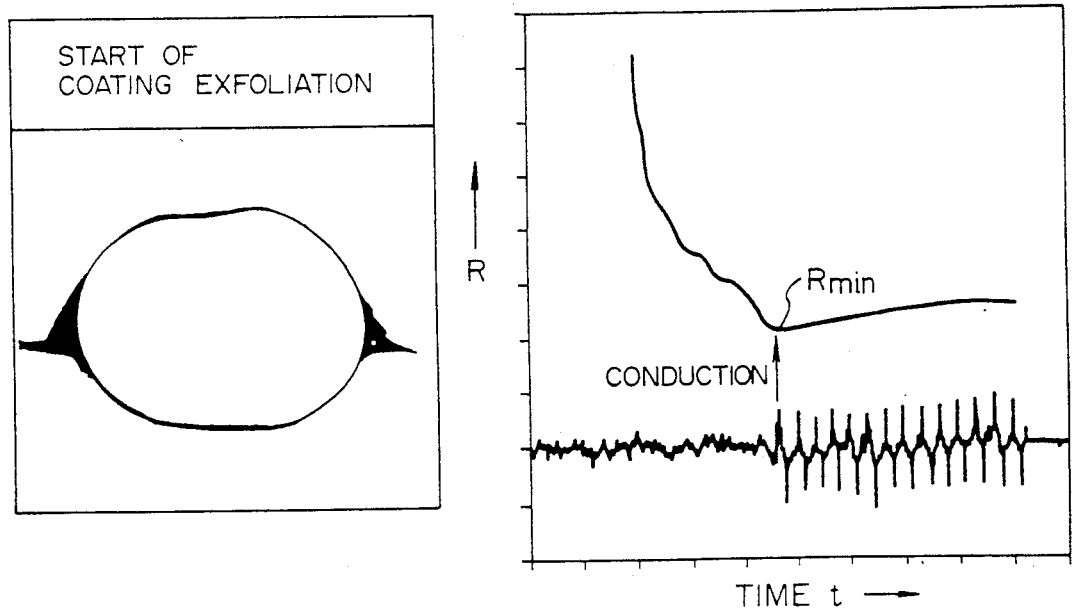
FIG. 3 is an explanatory diagram for explaining a coating exfoliation start timing with a variation in the inter-electrode resistance R.
Figure 4:
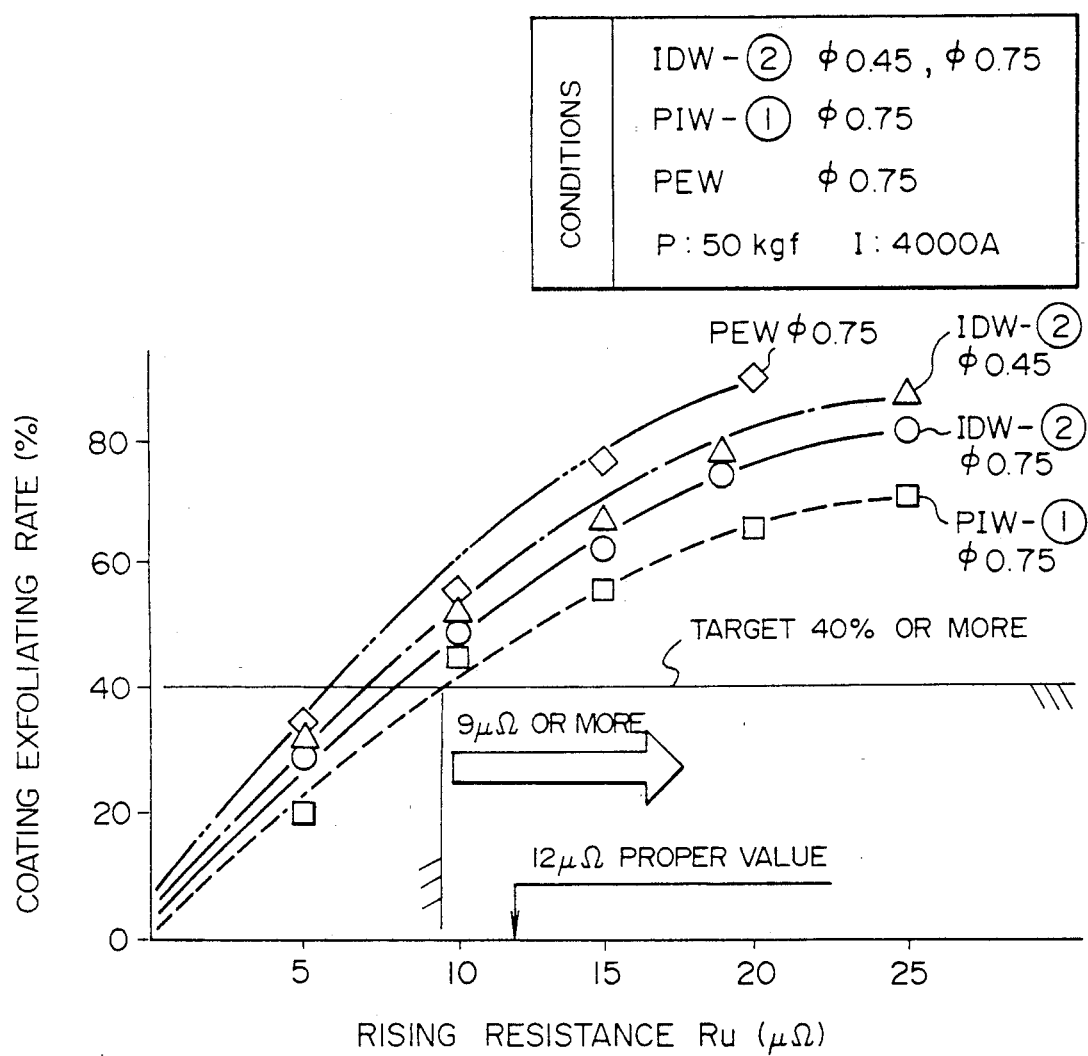
FIG. 4 is a graphic chart showing a relationship between a coating exfoliating rate and a rising resistance RU.

Further, when the inter-electrode resistance R takes the minimum resistance Rmin, as illustrated in FIG. 3, a degree of conduction between the upper and lower electrodes abruptly rises. Known was the fact that not the welding but a complete coating exfoliation of the coated wire (the direct contact or complete electrical contact of the wire and the terminal) tarts when R=Rmin. It was also known therefrom that the coating exfoliating process can be separated from the welding process in the resistance welding. Further, the degree of increment in the inter-electrode resistance R after being decreased down to the minimum resistance Rmin is expressed by the rising resistance RU as indicated by the characteristic curve La in FIG. 2. In this case, it proved that the rising resistance RU has a close correlativity to a coating exfoliation rate of the coated wire as shown in FIG. 4. It is also known from the above-mentioned that if the welding current continues to flow till the rising resistance TRU increases up to the preset value RUO (a value enough to secure a necessary coating exfoliation rate), the coating exfoliated state of the coated wire can be always stably kept with no unevenness. Such a phenomenon is similarly obtained by controlling a quantity of input heat (square of welding current × inter-electrode resistance × time) from the time when the inter-electrode resistance R reaches the minimum resistance Rmin.

Further, a degree of collapse of the coated wire is set proper, thereby improving a joint efficiency and securing a stable welding strength in the welding process. For this purpose, a relationship between the degree of collapse of the coated wire and the joint efficiency was examined in many ways through tests. After the rising resistance RU has reached the above-described set rising resistance value RUO, a conduction of the welding current temporarily halts for a cooling or temperature-keeping period. A resistance exothermic quantity is increased with an enhancement of the contact resistance between the two electrodes and the welded material by controlling the welding pressure (i.e., welding pressure P) on the terminal and the coated wire through the upper electrode down to a pressure as indicated by the characteristic curve Lc in FIG. 2. The resistance welding is promoted while reducing the degree of collapse of the coated wire. Besides, when R=Rmin is established with a start of the coating exfoliation, the corresponding downward-displacement quantity of the upper electrode reaches the preset electrode displacement quantity Xo (see a characteristic curve Lb in FIG. 2) of the upper electrode. It was known that if the conduction of the welding current is ended off at this time, it is possible to improve the joint efficiency and obtain the stable welding strength.

A comparative judging circuit 130 gives, when actuated, a welding pressure control circuit 150 a command to augment the opening of the proportional control valve 50 up to a value of the welding pressure P enough to exfoliate the coating of the coated wire 30b. Thereafter, the circuit 130 commands the current control circuit 140 to output the welding current I from the welding power supply 60. Further, the comparative judging circuit 130 compares each rising resistance RU given from the arithmetic processing circuit 100 with the rising resistance RUO given from the rising resistance setting circuit 110. When RU=RUO is established, the circuit 130 makes such judgments that there are necessities to temporarily halt the conduction of the welding current I and to lower the welding pressure P on the welded material 30. In addition, the comparative judging circuit 130 commands the current control circuit 140 to resume the conduction of the welding current I with a stability of the welding pressure P after a predetermined time (preset from the test) has elapsed in connection with reducing of the welding pressure P through the arithmetic processing circuit 100. The electrode displacement quantity X given from the arithmetic processing circuit 100 is compared with the set electrode displacement quantity Xo given from the displacement quantity setting circuit 120. When X=Xo is established, the comparative judging circuit 130 makes judgments to finish both the conduction of the welding current I and the pressurization on the welded material 30.

The current control circuit 140 controls the welding power supply 60. This control is effected to output the welding current I from the welding power supply 60, temporarily stop the output of the welding current I, resume the output of the welding current I and end off the output of the welding current I. These actions are performed in response to the command for the conduction of the welding current I, the judgment to temporarily halt the conduction thereof, the judgment to resume the conduction and the judgment to end off the conduction. Further, the welding pressure control circuit 150 controls the proportional control valve 50. this control is conducted so that the opening of the proportional control valve 50 is increased or decreased and made zero in response to the commands to increment and decrement the welding pressure P and the end command that are issued from the comparative judging circuit 130.

In accordance with the thus constructed first embodiment, it is assumed that the welded material 30 is, as illustrated in FIG. 1, mounted on the mounting surface 21 of the lower electrode 20 under the pressurizing surface 11 of the upper electrode 10 of the resistance welding machine M. In this instance, it is also presumed that both the welding pressure P on the welded material 30 and the welding current from the welding current power supply 60 are zero. On the occasion of the resistance welding on the welded material 30, however, if the control unit E is brought into an active state when the time t=t0 in FIG. 2, the arithmetic processing circuit 100 effects the arithmetic to increase the welding pressure P to a value enough to peel off the coating of the coated wire 30b. With this action, the comparative judging circuit 130 outputs, to the welding pressure control circuit 150, a command needed for setting the opening of the proportional control valve 50 to a value corresponding to the coating exfoliation value of the welding pressure P. Consequently, the welding pressure control circuit 150 controls the opening of he proportional control valve 50. The air flow from the pneumatic source 50a is thereby pressure-fed to the air cylinder 40. Besides, this air cylinder 40 moves down the upper electrode 10 in accordance with the air flow from the proportional control valve 50, thereby starting an operation to apply the welding pressure P as a value enough to peel off the coating on the welded material 30. At this moment, the displacement quantity detection circuit 90 detects and outputs the electrode displacement quantity X (see t=t0 in FIG. 2) of the upper electrode 10.

Subsequently, when the time t=t1 in FIG. 2 with the increase in the welding pressure P, the arithmetic processing circuit 100 executes an arithmetic operation required for outputting the welding current I from the welding power supply 60. With this operation, the comparative judging circuit 130 outputs, to the current control circuit 140, a command to output the welding current I from the welding power supply 60. For this purpose, the relay 60a closes the relay switch Y when excited by the relay coil Ry thereof under the control of the current control circuit 140. In response to this action, the welding power supply 60 starts the conduction of the welding current I through the power supply conductor 61, the upper electrode 10, the welded material 30, the lower electrode 20 and the power supply conductor 62 (see the symbol Ld in FIG. 2). At this time, the welding current I is detected by the welding current detection circuit 70 (see FIG. 2). The inter-electrode voltage V between the upper electrode 10 and the lower electrode 20 is at the same time detected by the voltage detection circuit 80.

After effecting the above-mentioned output arithmetic process of the welding current I, the arithmetic processing circuit 100 computes the effective values IRMS, VRMS thereof on the basis of the detected welding current given from the welding current detection circuit 70 and the inter-electrode voltage given from the voltage detection circuit 80 per sampling timing cycle. Based on the two effective values IRMS, VRMS, the circuit 100 computes an inter-electrode resistance R between the upper electrode 10 and the lower electrode 20. Simultaneously, the circuit 100 compares two continuous inter-electrode resistances R among the inter-electrode resistances R. The circuit 100 sequentially selects the smaller of the two electrode resistances thus compared. Selected further is the electrode displacement quantity X from the displacement quantity detection circuit 90 that corresponds to each selected inter-electrode resistance R. In such a case, as shown in FIG. 2, both of the electrode displacement quantity X and the inter-electrode resistance R start decreasing from the time when t=t1. This implies a start of the exfoliation of the coating 33 of the coated wire 30a.

During such a process, when t=t2 as shown in FIG. 2, the latest selected inter-electrode resistance R coincides with a selected inter-electrode resistance R just before it, thereby reaching the minimum value. Concomitantly, the arithmetic processing circuit 100 determines the same latest selected inter-electrode resistance R as a minimum resistance Rmin. Besides, the latest electrode displacement quantity X corresponding to the minimum resistance Rmin is determined as a minimum displacement quantity Xmin. Thereafter, the circuit 100 computes a rising resistance RU from the minimum resistance Rmin per sampling timing cycle on the basis of the inter-electrode resistance R. The circuit re-computes the electrode displacement quantity X given afterward from the displacement quantity detection circuit 90 as an electrode displacement quantity X on the basis of the minimum displacement quantity Xmin.

Thereafter, when the time t=t3 in FIG. 2, the latest rising resistance RU comes to a rising resistance RUO.

Hereupon, the comparative judging circuit 130 judges that RU=RUO is established. The circuit 130 also make judgments that the conduction of the welding current I is required to be temporarily halted and that the welding pressure P on the welded material 30 is required to be reduced under the coating exfoliation value. Then, the current control circuit 140 controls the relay coil Ry of the relay 60a to be temporarily demagnetized in response to the judgment to temporarily halt the conduction of the welding current I which has been made by the comparative judging circuit 130. With this action, the relay 60a temporarily opens its relay switch Y, whereby the output of the welding current I from the welding power supply 60 is temporarily stopped. An increment in the inter-electrode resistance R is thereby temporarily halted (see t=t3~t4 in FIG. 2). Besides, the welding pressure control circuit 150 controls the proportional control valve 50 to reduce its valve opening in response to the judgment to decrease the welding pressure P that has been given from the comparative judging circuit 130. Consequently, the quantity of the air flow pressure-fed to the air cylinder 40 from the proportional control valve 50 is reduced. The down-movement of the upper electrode 10 halts, and the reduction in the electrode displacement quantity X is also stopped. Besides, the welding pressure P on the welded material 30 decreases (see t=t3~t4 in FIG. 2).

The reduction of the welding pressure P is completed when the time t=t4. After a predetermined time has passed, the welding pressure P is stabilized based on the latest detected displacement quantity X in the arithmetic processing circuit 100. Then, the comparative judging circuit 130 makes a judgment to resume the conduction of the welding current I. concomitantly, the current control circuit 140 controls to re-excite the relay coil Ry of the relay 60a. Therefore, the relay 60a closes the relay switch Y thereof. In response to this action, the conduction of the welding current I from the welding power supply 60 occurs again via the power supply conductor 61, the upper electrode 10, the welded material 30, the lower electrode 20 and the power supply conductor 62. This implies a shift to the welding process of the welded material 30 after the coating has been peeled off.

In this state, the welding between the terminal 30a and the tip part of the coat-exfoliated wire 32 from the coated wire 30b progresses under the foregoing stabilized condition where the welding pressure P is lowered. The inter-electrode resistance R in the arithmetic processing circuit 100 rectilinearly increases as shown in FIG. 2, whereas the electrode displacement quantity X rectilinearly decreases as shown in FIG. 2. Thereafter, when the time t=t5, the electrode displacement quantity X in the arithmetic processing circuit 100 reaches the set electrode displacement quantity Xo. Hereupon, the comparative judging circuit 130 judges that X=Xo is established in cooperation with the arithmetic processing circuit 100 and the electrode displacement quantity setting circuit 120 as well. The circuit 130 also makes a judgment to halt the conduction of the welding current I. At the same time, the circuit 130 make a judgment to stop the pressurization on the welded material 30. Subsequently, the relay coil Ry of the relay 60a is demagnetized to open the relay switch Y under the current control circuit 140 in response to the judgment to halt the conduction of the welding current I by the comparative judging circuit 130. The output of the welding current I from the welding power supply 60 is thereby ended off. Further, the proportional control valve 50 is controlled to close by the welding pressure control circuit 150 in response to the judgment to stop the pressurization that has been made by the comparative judging circuit 130. The pressure-feed of the air flow to the upper electrode 20 via the air cylinder 40 comes to an end. At this time, the inter-electrode resistance R is fixed (see FIG. 2). This implies that the pressure-feed of the air flow to the upper electrode 20 is finished when an inter-electrode electric energy becomes uniform.

As discussed above, in accordance with the first embodiment, the welding pressure P acts on the welded material 30 with a value enough to peel off the coating of the coated wire 30b in the coating exfoliating process. Simultaneously, the welded material 30 conducts the welding current I. This continues till the rising resistance RU increases up to the set rising resistance RUO after the inter-electrode resistance R has reached the minimum resistance Rmin. Then, the coating exfoliating process is ended off when RU=RUO is established, and the operation shifts to the welding process. The conduction of the welding current I temporarily halts, and simultaneously the welding pressure P is lowered. With the welding pressure P stabilized afterwards, the conduction of the welding current I is restarted. The welding process is finished when the electrode displacement quantity X reaches the set displacement quantity Xo. Hence, when the welded material 30 undergoes the resistance welding in the resistance welding machine M, this resistance welding control is conducted while being separated in terms of time into the coating exfoliating process and the resistance welding process. When establishing RU=RUO, the coating exfoliating process is completed. Hence, the stable coating-exfoliated state is attainable. Further, The tip part of the wire 33 is resistance-welded to the terminal 30a in the welding process under the lowered welding pressure P after the coating has been peeled off. This resistance welding is therefore attainable with a stabilized welding strength and a high joint efficiency without causing an excessive collapse of the wire 33. As a result, the resistance welding machine M is capable of securing the high quality resistance welding of the welded material 30 without causing deteriorations of the coating exfoliation and welding.

In this connection, there was performed a comparative test between the resistance welding quality in the first embodiment and that in the prior art. The result as shown in FIG. 5 was obtained. According to this result, it can be understood that the collapse of the wire according to this invention can be restrained more than in the prior art. It is because a sectional area of the welded part of the welded material 30 is increased by a factor of 1.2 as large as that in the prior art on the premise of confirmative conditions as shown in FIG. 5. Moreover, as illustrated in FIG. 5, a tensile strength increases more stably than in the prior art. It can be known that the welding strength (corresponding to a tensile shearing strength) in this invention increases more stably than in the prior art. Further, as shown in FIG. 5, it is also known that a fraction defective of welding due to deteriorations of the strength and the exfoliation in the present invention is reduced more remarkably than in the prior art.

Figure 6:
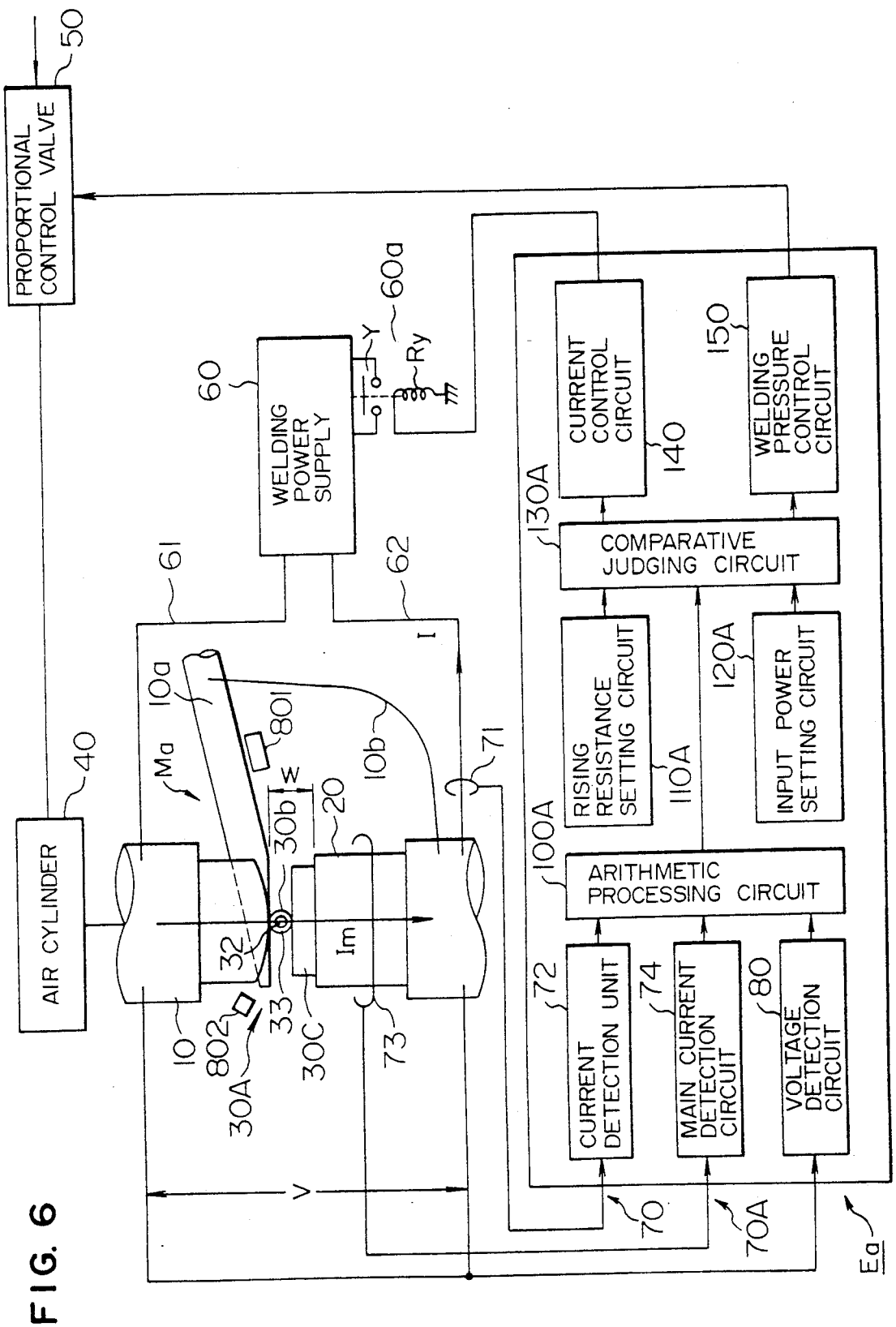
FIG. 6 is a whole schematic block diagram showing a second embodiment of the present invention.

Next a second embodiment of the present invention will be described with reference to the drawings. The second embodiment has the following constructive features. As shown in FIG. 6, a triple electrode type resistance welding machine Ma and a control unit Ea are adopted in place of the resistance welding machine M and the control unit E which have been explained in the first embodiment. A welded material 30A is resistance-welded in stead of the welded material 30. The resistance welding machine Ma has substantially the same construction as that of the resistance welding machine M except that an intermediate electrode 10a and a short-circuit conductor 10b are added to the resistance welding machine M described above. The intermediate electrode 10a is fixed to a lower end peripheral wall part of the upper electrode 10. The short-circuit conductor 10b short-circuits the intermediate electrode 10 and the lower electrode 20. The welded material 30A includes a terminal 30c in stead of the terminal 30a of the welded material 30. This terminal 30c is mounted on the mounting surface of the lower electrode 20. At the same time, the pressurizing surface of the upper electrode depresses the tip part of the coated wire 30b directly on the terminal 30c. Excepting this point, the welded material 30A has substantially the same construction as that of the welded material 30. Note that the welding current, upon entering the upper electrode 1D, flows into the lower electrode via the short-circuit conductor 10b because of an insulating property of the coating of the coated wire 30b; and the welding current runs as a main current Im into the lower electrode 20 via the welded material 30A with the exfoliation of the coat.

The control unit Ea includes a current detection circuit 70A in addition to the current detection circuit 70 described in the first embodiment. This current detection circuit 70A detects the main current Im flowing across the lower electrode 20 with the aid of a current detection coil 73. A result of this detection is detected and amplified as a detected main current by means of a main current detection circuit 74. Besides, the control unit Ea has an arithmetic processing unit 100A. This arithmetic processing circuit 100A effects, when actuated, an arithmetic to increase the welding pressure P on the welded material 30A up to a value enough to exfoliated the coating of the coated wire 30b. With an end of the enhancement of this welding pressure P, the circuit 100A performs an arithmetic necessary for outputting the welding current I from the welding power supply 60.

Thereafter, the arithmetic processing circuit 100A computes effective values IRMS, VRMS thereof on the basis of the detected welding current given from the welding current detection circuit 70 and the inter-electrode voltage given from the voltage detection circuit 80 per sampling timing cycle. Based on the two effective values IRMS, VRMS, the circuit 100 computes the inter-electrode resistance R (=VRMS/IRMS) between the upper electrode 10 and the lower electrode 20. Simultaneously, the circuit 100 compares two continuous inter-electrode resistances among the inter-electrode resistances R. The circuit 100 sequentially selects the smaller of the two electrode resistances thus compared. Further, the latest selected inter-electrode resistance R coincides with a selected inter-electrode resistance R just before it, thereby reaching the maximum value. Concomitantly, the arithmetic processing circuit 100A determines the same latest selected inter-electrode resistance R as a maximum resistance Rmax. Thereafter, the circuit 100A computes an effective value IMRMS on the basis of the detected main current given from the current detection circuit 70A per sampling timing cycle. The circuit 100A performs an arithmetic to obtain an input power PW through a time-based integration of the product of a square of each effective value IMRMS and the inter-electrode resistance R. Besides, a rising resistance RL from the maximum resistance Rmax is computed based on the inter electrode resistance R. A falling resistance setting circuit 110A sets a falling resistance RLO which will be stated later. An input power setting circuit 120A sets a predetermined power PWo that will hereafter be explained.

By the way, the following is a reason why concepts of the inter-electrode resistance R, the maximum resistance Rmax, the input power PW and the falling resistance RL are introduced, as described before, into the arithmetic operation by the arithmetic processing circuit 100A. There will be explained why concepts of the falling resistance RLO set by the falling resistance setting circuit 110A and the input power PWo set by the input power setting circuit 120A are introduced thereinto. Where the coated wire is resistance welded to the terminal by the triple electrode type resistance welding machine Ma, the welding conditions such as a welding current, a conducting time and a welding pressure, etc. are fixed. Consequently, the coating exfoliating time and the welding time fluctuate, resulting in deteriorations of the welding strength and of welding spark. The present inventors found out from repetitions of various tests that the reliability on the resistance welding quality can be remarkably improved by eliminating the drawbacks described above. This involves performing the resistance welding in the following manner by effectively utilizing such a phenomenon that the inter-electrode resistance is reduced with an inflow of the main current Im when the coating is peeled off. Namely, the inventors examined how the inter-electrode resistance R at the time of obtaining a good resistance welding quality between the coated wire and the terminal varies in the course of the resistance welding. It was known that this inter-electrode resistance R exhibits a convex-like variation tendency as shown in the left half of a characteristic curve Le in FIG. 7; and it has a maximum resistance Rmax.

In such a case, the fact that the inter-electrode resistance R increases toward the maximum resistance Rmax and deceases after reaching the same maximum resistance Rmax is derived from the following reason. At an initial stage where the two electrodes 10, 20, the intermediate electrode 10a and the short-circuit conductor 10b are charged with electricity, the welding current flows mainly across the intermediate electrode 10a and the short-circuit conductor 10b in relation with the coated wire and the coat. Temperatures of the two electrodes 10, 20 are therefore low. Hence, each internal resistance of the two electrodes 10, 20 is small, the inter-electrode resistance R is also small. Thereafter, the current running across the short-circuit conductor 10b is reduced with progressions of the coating exfoliation and pressurization, whereas the current flowing across the two electrodes 10, 20 increases. The temperatures of the two electrodes 10, 20 rise. Each internal resistance thereof augments, and the inter-electrode resistance R likewise increases. Then, the inter-electrode resistance R comes to the maximum resistance Rmax, and the coating is concomitantly peeled off. Thereafter, the inter-electrode resistance R decreases because of a parallel circuit constructed of the intermediate electrode 10a, the short-circuit conductor 10b, the two electrodes 10, 20 and the wire part. The above-mentioned is the reason why the inter-electrode resistance R decreases after reaching the maximum resistance Rmax. Further, a complete coating exfoliation of the coated wire (the direct contact or complete electrical contact between the wire and terminal) starts when R=Rmax. This is understood from the fact that the main current Im flows as indicated by the symbol Lf in FIG. 7 when the inter-electrode resistance R takes the maximum resistance Rmax. It can be also known from this fact that the resistance welding is separable into the coating exfoliating process and the welding process.

Figure 7:
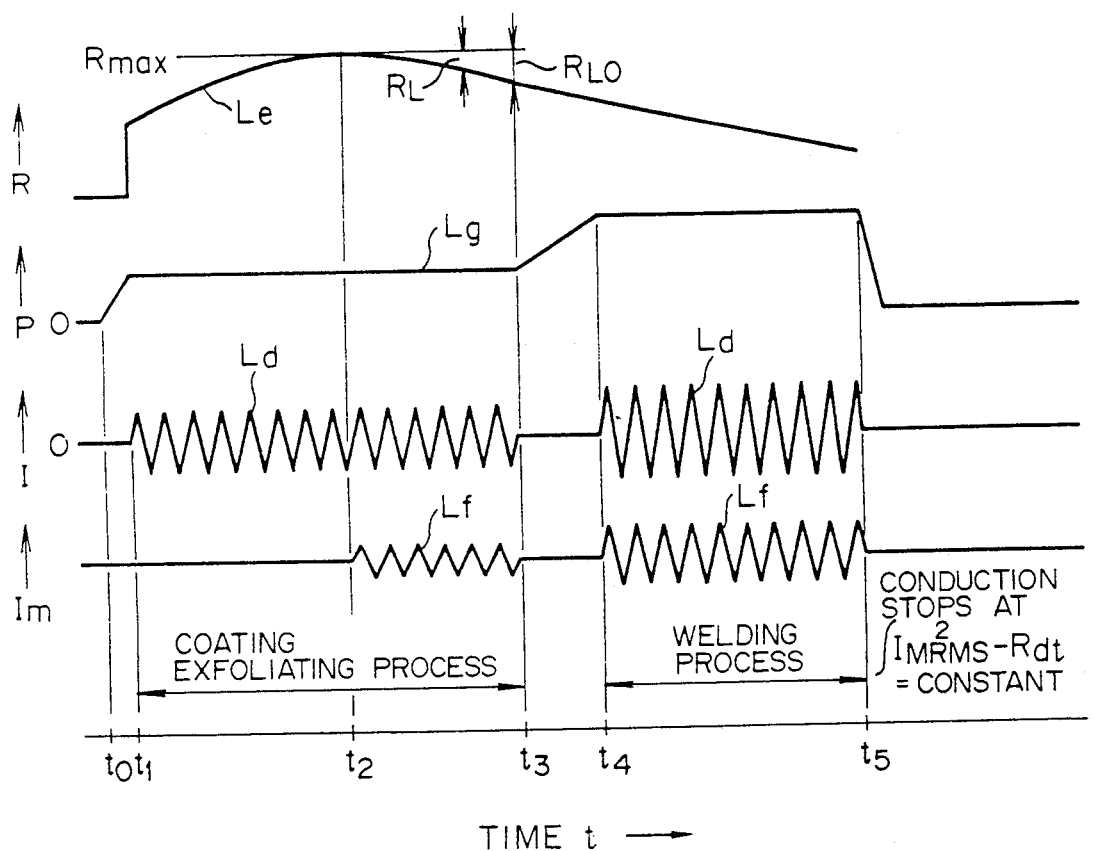
FIG. 7 is a time chart showing variations in the inter-electrode resistance R, the welding pressure P, the welding current I and a main current Im.
Figure 8:
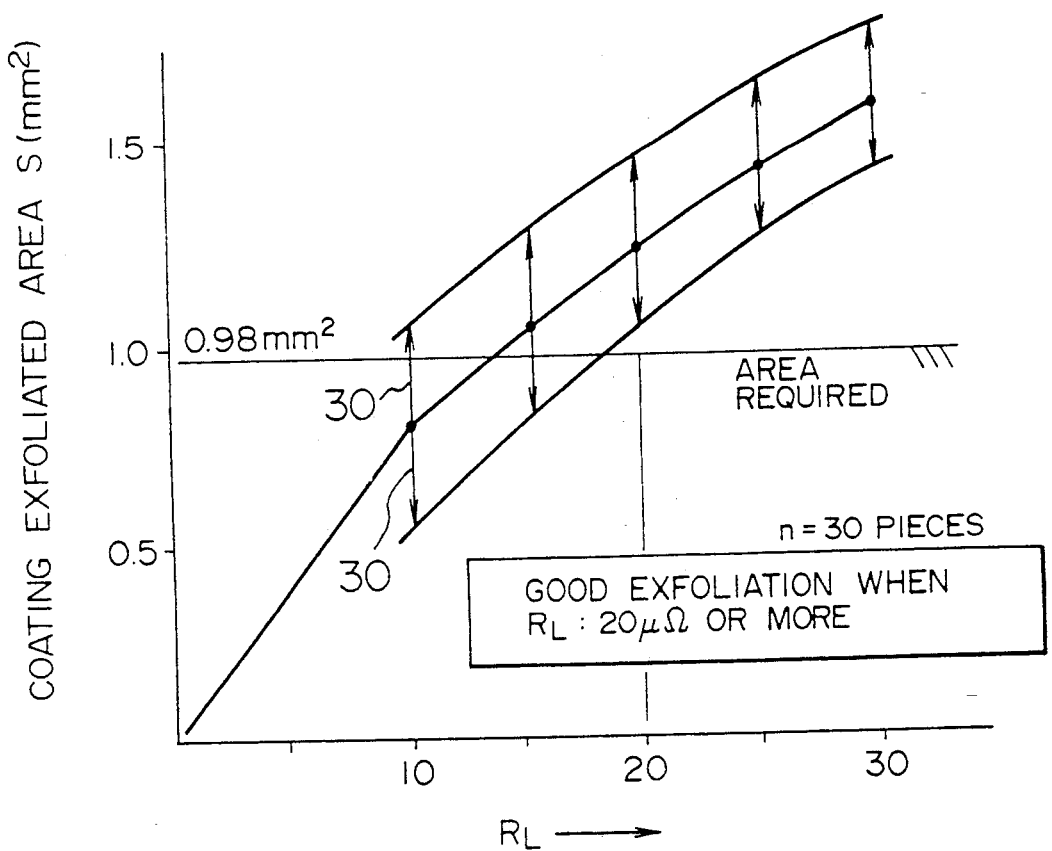
FIG. 8 is a graphic chart showing a relationship between a coating exfoliated area S and a falling resistance RL.

Furthermore, a degree of reduction of the inter-electrode resistance R after increasing up to the maximum resistance Rmax is expressed by a falling resistance RL as indicated by a characteristic curve Le in FIG. 7. This falling resistance RL proved to be closely correlative to the coating exfoliated area of the coated wire as shown in FIG. 8. It was also known from the above-mentioned that if the welding current flows till the falling resistance RL is reduced down to a preset value RLO (value for securing a necessary coating exfoliated area), the coating exfoliated state of the coated wire can be always kept stable with no unevenness.

Figure 9:
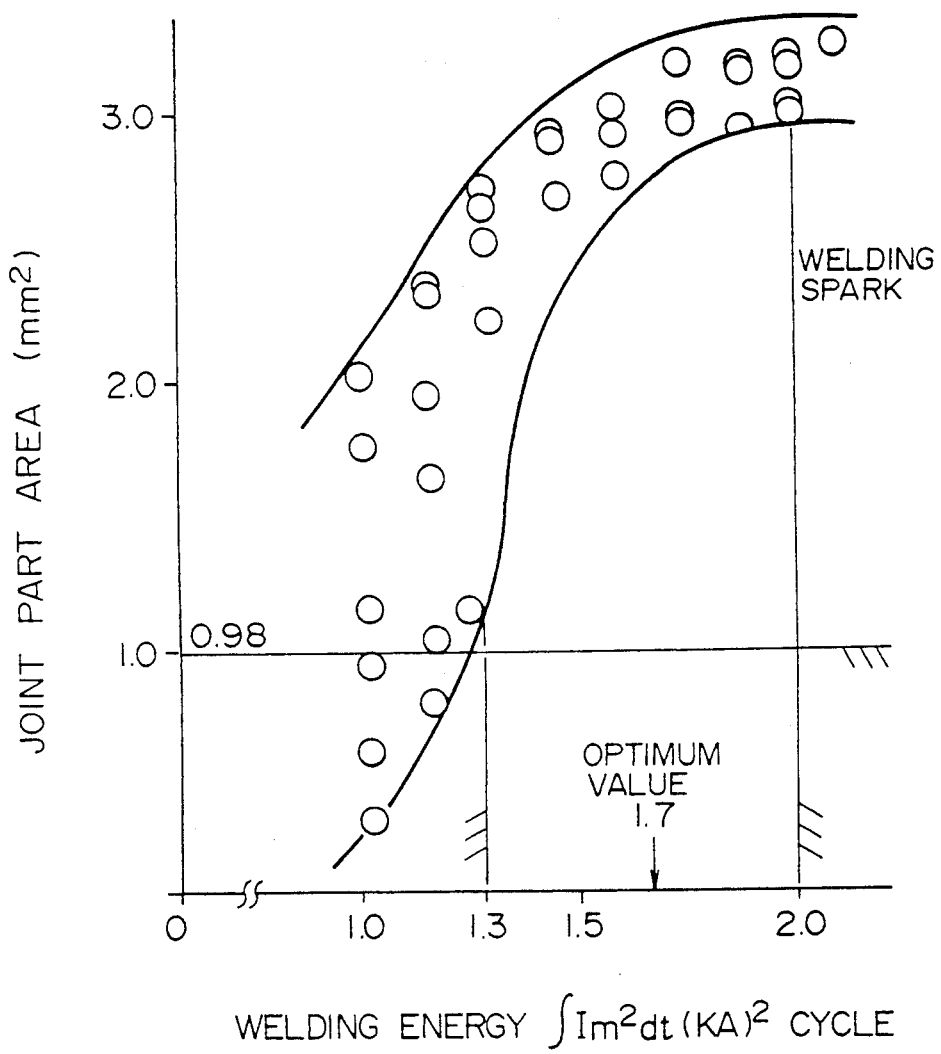
FIG. 9 is a graphic chart showing a relationship between a joining part area and an welding energy.
Figure 10:
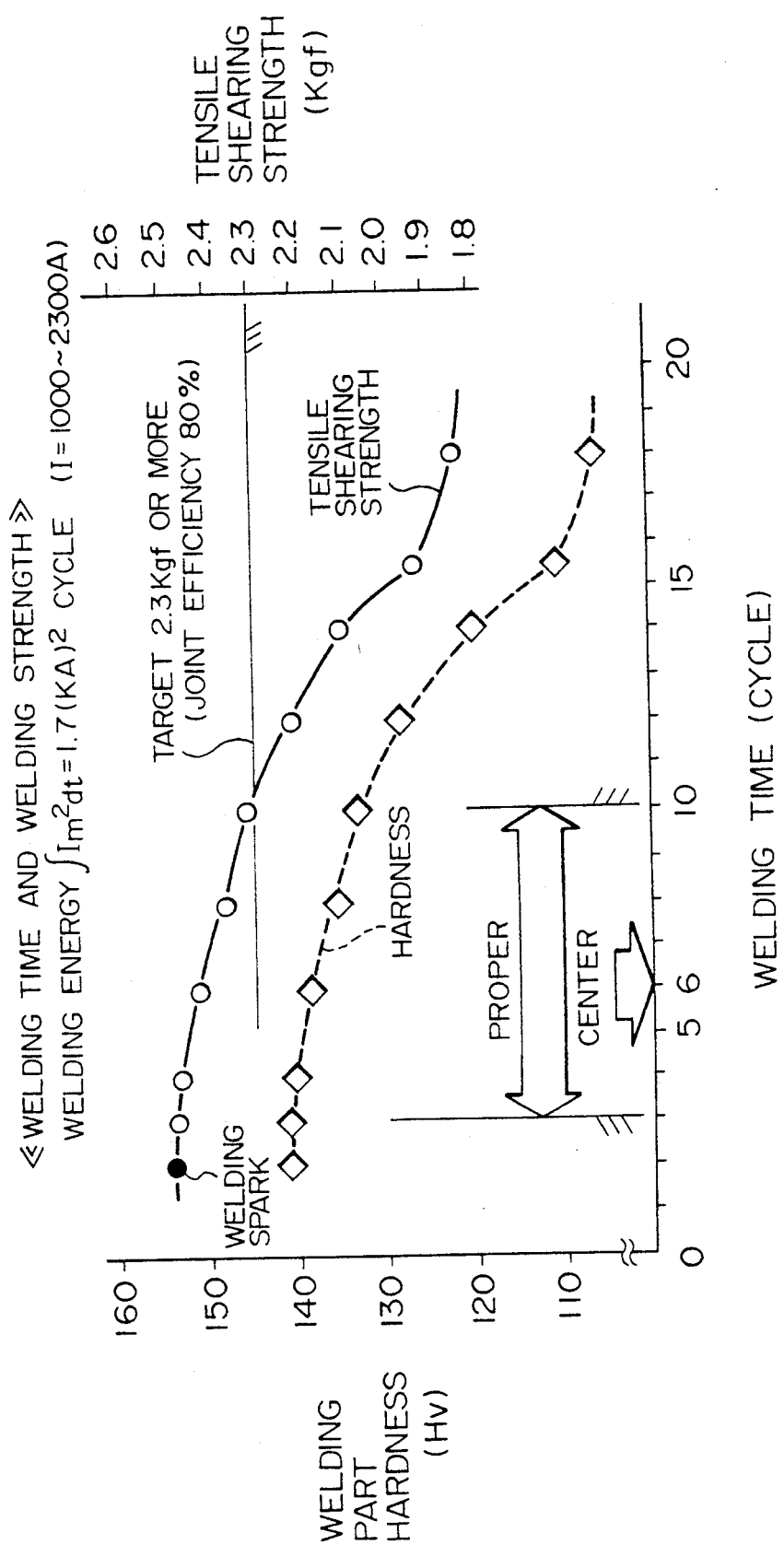
FIG. 10 is a graphic chart showing a relationship between a welding part hardness, i.e., a welding strength and a welding time.

Besides, a relationship between a degree of collapse of the coated wire and a joint efficiency was examined in many ways through tests in order to improve the joint efficiency and secure a stable welding strength by making proper the degree of collapse of the coated wire in the welding process. The following was known therefrom. After the falling resistance RL has reached the set falling resistance value RLO explained above, the conduction of the welding current is temporarily halted for a cooling or temperature keeping period. Then, the welding pressure P applied via the upper electrode on the coated wire rises to a value enough to restrain softening of the wire through short-time welding as shown by a characteristic curve Lg in FIG. 7. Further, the input power PW corresponding to an establishment of RL - RLO when finishing the coating exfoliation comes to a preset input power PWo (a value necessary for securing a connected area corresponding to the stable welding strength between the wire 32 and the terminal as shown in FIG. 9). At this time, the conduction of the welding current halts. Hereupon, it is possible to improve the joint efficiency (see FIG. 10) under the restraint of softening of the wire and obtain the stable welding strength.

A comparative judging circuit 130A commands, when actuated, the welding pressure control circuit 150 to increase the opening of the proportional control valve 50 up to a value of the welding pressure P enough to exfoliate the coating of the coated wire 30b. Thereafter, the circuit 130A commands the current control circuit 140 to output the welding current I from the welding power supply 60. Further, the comparative judging circuit 130 compares each falling resistance RL given from the arithmetic processing circuit 100A with the falling resistance RLO given from the falling resistance setting circuit 110A. When RL=RLO is established, the circuit 130A makes such judgments that there are necessities to temporarily halt the conduction of the welding current I and to increase the welding pressure P on the welded material 30A. In addition, the comparative judging circuit 130A commands the current control circuit 140 to resume the conduction of the welding current I with a stability of the welding pressure P after a predetermined time (needed for stabilizing the welding pressure) has elapsed in connection with enhancing of the welding pressure P through the arithmetic processing circuit 100A. The comparative judging circuit 130A compares each input power PW from the arithmetic processing circuit 100A with the set input power PWo from the input power setting circuit 120A. The circuit 130A makes judgments to halt the conduction of the welding current and to finish the pressurization on the welded material 30A when establishing PW=PWo. Other constructions are substantially the same as those in the first embodiment.

In accordance with the thus constructed second embodiment, it is assumed that the welded material 30A is, as illustrated in FIG. 6, mounted on the mounting surface of the lower electrode 20 under the pressurizing surface of the upper electrode 10 of the resistance welding machine Ma. In this instance, it is also presumed that both the welding pressure P on the welded material 30A and the welding current from the welding current power supply 60 are zero. On the occasion of the resistance welding on the welded material 30A, however, if the control unit Ea is brought into an active state when the time t=t0 in FIG. 7, the arithmetic processing circuit 100A effects the arithmetic to enhance the welding pressure P to a value enough to peel off the coating of the coated wire 30b. With this action, the comparative judging circuit 130A outputs, to the welding pressure control circuit 150, a command needed for setting the opening of the proportional control valve 50 to a value corresponding to the coating exfoliation value of the welding pressure P. Consequently, the welding pressure control circuit 150 controls the opening of the proportional control valve 50. The air flow from the pneumatic source 50a is thereby pressure-fed to the air cylinder 40. Besides, this air cylinder 40 moves down the upper electrode 10 in accordance with the air flow from the proportional control valve 50, thereby applying the welding pressure P as a value enough to peel off the coating on the welded material 30A.

Subsequently, when the time t=t1 in FIG. 7 with the increase in the welding pressure P, the arithmetic processing circuit 100A executes an arithmetic operation required for outputting the welding current I from the welding power supply 60. With this operation, the comparative judging circuit 130A outputs, to the current control circuit 140, a command to output the welding current I from the welding power supply 60. For this purpose, the relay 60a closes the relay switch Y as in the first embodiment discussed above. Concomitantly, the welding current I flows from the welding power supply 60 via the power supply conductor 61 to the upper electrode 10. Hereupon, this inflow welding current runs into the lower electrode 20 via the intermediate electrode 10a and the short-circuit conductor 10b. Thereafter, the welding current runs into a power supply conductor 62 (see the symbol Ld in FIG. 7). At this time, the welding current I is detected by the welding current detection circuit 70, and simultaneously, the inter-electrode voltage V between the upper and lower electrodes 10, 20 is detected by the voltage detection circuit 80.

After effecting the above-mentioned output arithmetic process of the welding current I, the arithmetic processing circuit 100A computes the effective values IRMS, VRMS thereof on the basis of the detected welding current given from the welding current detection circuit 70 and the inter-electrode voltage given from the voltage detection circuit 80 per sampling timing cycle. Based on the two effective values IRMS, VRMS, the circuit 100 computes an inter-electrode resistance R between the upper electrode 10 and the lower electrode 20. Simultaneously, the circuit 100 compares two continuous inter-electrode resistances R among the inter-electrode resistances R. The circuit 100 sequentially selects the smaller of the two electrode resistances thus compared. In such a case, as shown in FIG. 7, the inter-electrode resistance R starts increasing from the time when t=t1. The exfoliating process of the coating 33 of the coated wire 30b is thereby started.

During such a process, when t=t2 as shown in FIG. 7, the latest selected inter-electrode resistance R coincides with a selected inter-electrode resistance R just before it, thereby reaching the maximum value. Then, the arithmetic processing circuit 100A determines the same latest selected inter-electrode resistance R as a maximum resistance Rmax. At this moment, the coating exfoliation of the coated wire 30b is started. The welding current as the main current Im running across the upper electrode 10 therefore flows into the lower electrode 20 via the welded material 30A (see FIG. 7). Thereafter, the arithmetic processing circuit 100A computes the effective value IMRMS on the basis of the main current detected by the current detection circuit 70A per sampling timing cycle. The circuit 100A computes the input power PW through the time-based integration of the product of a square of each effective value IMRMS and the inter-electrode resistance R. Further, the circuit 100A computes the falling resistance RL from the maximum resistance Rmax on the basis of the inter-electrode resistance R.

Thereafter, when the time t=t3 in FIG. 7, the latest falling resistance RL comes to a falling resistance RLO. Hereupon, the comparative judging circuit 130A judges that RL=RLO is established. The circuit 130A also make judgments that the conduction of the welding current I is required to be temporarily halted and that the welding pressure P on the welded material 30A is required to be increased above the coating exfoliation value. Then, the current control circuit 140 causes the relay switch Y of the relay 60a to be temporarily closed in response to the judgment to temporarily halt the conduction of the welding current I which has been made by the comparative judging circuit 130A. The output of the welding current I from the welding power supply 60 is temporarily stopped. Besides, the welding pressure control circuit 150 controls the proportional control valve 50 to expand its valve opening in response to the judgment to enhance the welding pressure P that has been given from the comparative judging circuit 130A. Consequently, the quantity of the air flow pressure-fed to the air cylinder 40 from the proportional control valve 50 augments. The upper electrode 10 is further moved down, while the welding press P on the welded material 30A increased (see time t=t3~t4 in FIG. 7).

The enhancement of the welding pressure P is completed when the time t=t4. After a predetermined time has passed, the welding pressure P is stabilized. Then, the comparative judging circuit 130A makes a judgment to resume the conduction of the welding current I. Concomitantly, the current control circuit 140 controls the relay 60a to close again the relay switch Y of the relay 60a. Therefore, the welding current I as the main current flows again into the lower electrode 20 across the upper electrode 10 and the welded material 30A from the welding power supply 60. It is therefore follows that the operation is shifted to the welding process of the welded material 30A after the coating has been exfoliated.

In this state, the welding between the terminal 30c and the tip part of the coat-exfoliated wire 32 from the coated wire 30b progresses under the foregoing stabilized condition where the welding pressure P is increased. Thereafter, the input power reaches the set input power PWo in the arithmetic processing circuit 100A when the time t=t5. Then, the comparative judging circuit 130A judges that PW=PWo is established in cooperation with the arithmetic processing circuit 100A and the input power setting circuit 120A as well. The circuit 130 also makes a judgment to halt the conduction of the welding current I. At the same time, the circuit 130 make a judgment to stop an application of the welding pressure on the welded material 30A. Subsequently, the current control circuit 140 controls the relay 60a to open the relay switch Y in response to the judgment to halt the conduction of the welding current I from the welding power supply 60 that has been made by the comparative judging circuit 130A. The output of the welding current I from the welding power supply 60 is thereby finished. Besides, the proportional control valve 50 is controlled to be closed by the welding pressure control circuit 150 in response to the judgment to halt the application of the welding pressure that has been given from the comparative judging circuit 130A. Ended is the pressure-feed of the air flow to the upper electrode 20 through the air cylinder 40.

As discussed above, in accordance with the second embodiment, the welding pressure P acts on the welded material 30A with a value enough to peel off the coating of the coated wire 30b in the coat exfoliating process. Simultaneously, the short-circuit conductor 10b conducts the welding current I. This continues till the falling resistance RL decreases down to the set falling resistance RLO after the inter-electrode resistance R has reached the maximum resistance Rmax. Then, the coating exfoliating process is ended off when RL=RLO is established, and the operation shifts to the welding process. The conduction of the welding current I temporarily halts, and simultaneously the welding pressure P is stepped up. With the welding pressure P stabilized afterwards, the conduction of the welding current I is restarted. The welding process is finished when the input power PW reaches the set input power PWo. Hence, when the welded material 30A undergoes the resistance welding in the resistance welding machine Ma, this resistance welding control is conducted while being separated in terms of time into the coating exfoliating process and the resistance welding process as in the first embodiment. When establishing RL=RLO, the coating exfoliating process is completed. Hence, the stable coating-exfoliated state is attainable. Further, The tip part of the wire 33 is resistance-welded to the terminal 30c in the welding process under the enhanced welding pressure P after the coating has been peeled off. This resistance welding is therefore attainable with a stabilized welding strength and a high joint efficiency without causing excessive softening of the wire 32. As a result, the resistance welding machine Ma is capable of attaining the high quality resistance welding of the welded material 30A without causing deteriorations of the coat exfoliation and welding.

Figure 11:
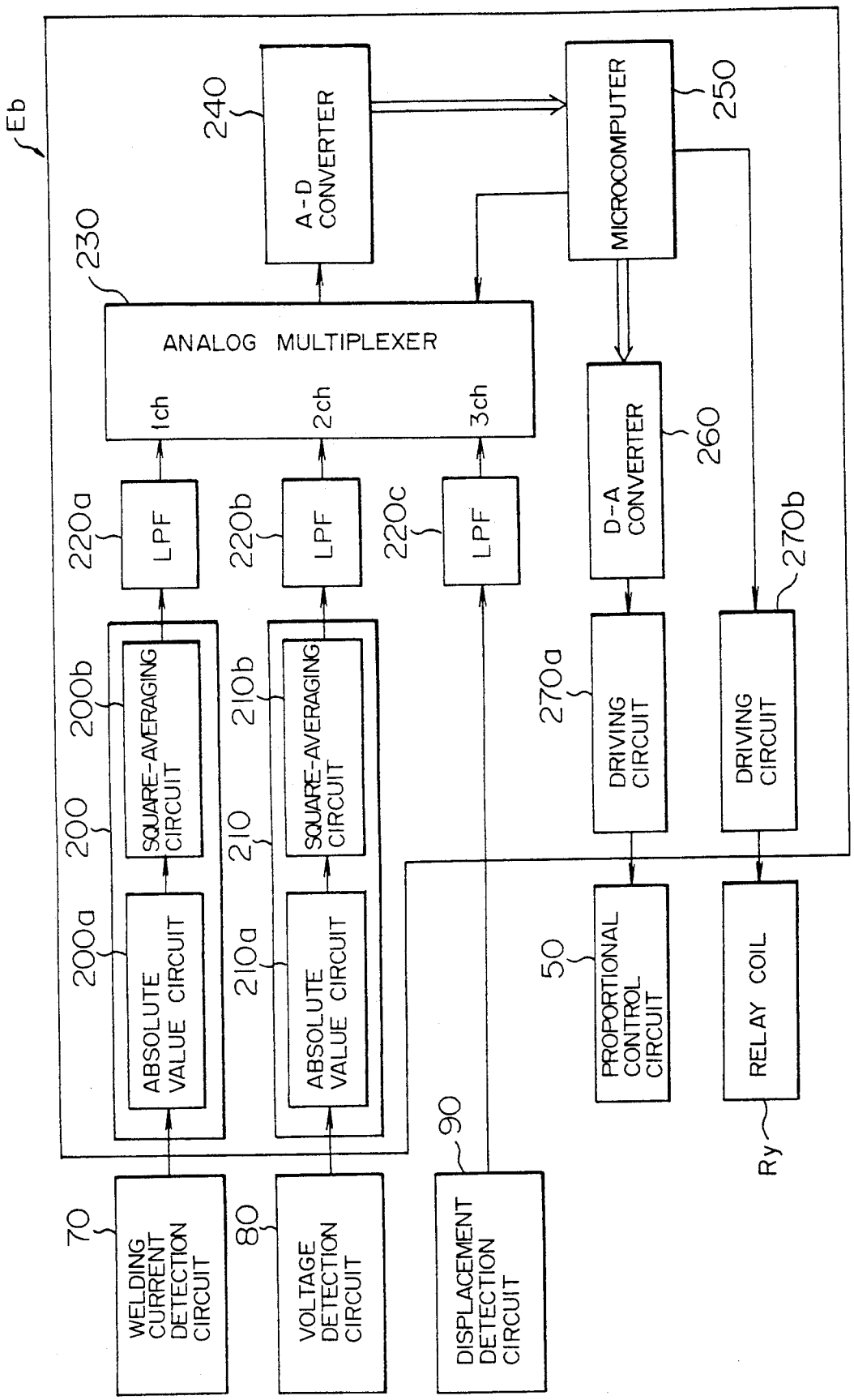
FIG. 11 is a block circuit diagram illustrating the principal portion of a third embodiment of the present invention.

Next, a third embodiment of the present invention will be described. The third embodiment is characterized in terms of construction by adopting a control unit Eb as shown in FIG. 11 in place of the control unit E stated in the first embodiment. The control unit Eb includes effective value arithmetic circuits 200, 210 connected respectively to the welding current detection circuit 70 and the voltage detection circuit 80 described in the first embodiment. The effective value arithmetic circuit 200 is composed of an absolute value circuit 200a connected to the welding current detection circuit 70 and a square-averaging circuit 200b connected to this absolute value circuit 200a. Thus, the absolute value circuit 200a takes an absolute value of the detected welding current from the welding current detection circuit 70 and generates an absolute value signal. The square-averaging circuit 200b effects square-averaging of the absolute value signals given from the absolute value circuit 200a. The circuit square-averaging circuit 200b computes an effective value (corresponding to the effective value IRMS of the welding current explained in the first embodiment) from a square-averaged result and outputs it in the form of a welding current effective value signal. The effective value arithmetic circuit 210 comprises an absolute value circuit 210a connected to the voltage detection circuit 80 and a square-averaging circuit 210b connected to this absolute value circuit 210a. Thus, the absolute value circuit 210a takes an absolute value of the inter-electrode voltage V and generates an absolute value signal. The square-averaging circuit 210b performs square-averaging of the absolute value signals given from the absolute value circuit 210a. This square-averaging circuit 210b computes an effective value (corresponding to the effective value VRMS of the inter-electrode voltage stated in the first embodiment) from a square-averaged result and outputs it in the form of an inter-electrode voltage effective value signal.

Further, the control unit Eb includes low-pass filters 220a, 220b and 220c (hereafter refereed to as LPF 220a, LPF 220b and LPF 220c) connected respectively to the effective value arithmetic circuits 200, 210 and the displacement quantity detection circuit 90. Cut-off frequencies Fc of the LPFs 220a, 220b, 220c are all set to 60 (Hz). Thus, the LPF 220a eliminates a frequency component higher than 60 (Hz) out of frequency components of the welding current effective value signals transmitted from the square-averaging circuit 200b of the effective value arithmetic circuit 200. The LPF 220a treats the remaining frequency components to generate filter current signals. The LPF 220b removes a frequency component higher than 60 (Hz) out of the frequency components of the inter-electrode voltage effective value signals transmitted from the square-averaging circuit 210b of the effective value arithmetic circuit 210. The LPF 220b treats the remaining frequency components to generate filter voltage signals. Further, the LPF 220c removes a frequency component higher than 60 (Hz) out of the frequency components of the electrode displacement quantity outputs given from the displacement quantity detection circuit 90. The LPF 220c treats the remaining frequency components to generate filter displacement quantity signals.

Figure 12:
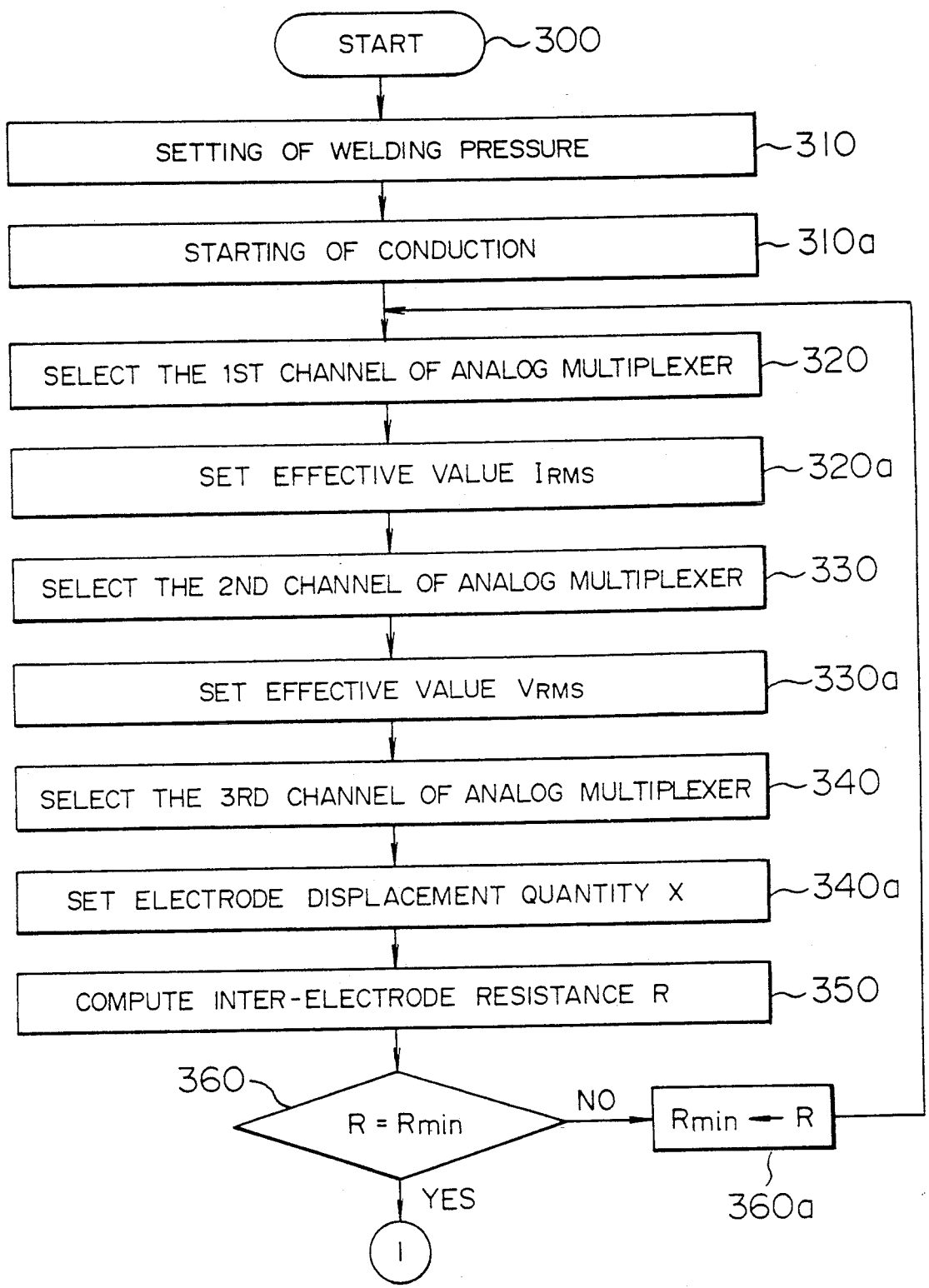
FIG. 12 is a flowchart showing a first part of actions of a microcomputer in FIG. 11.
Figure 13:
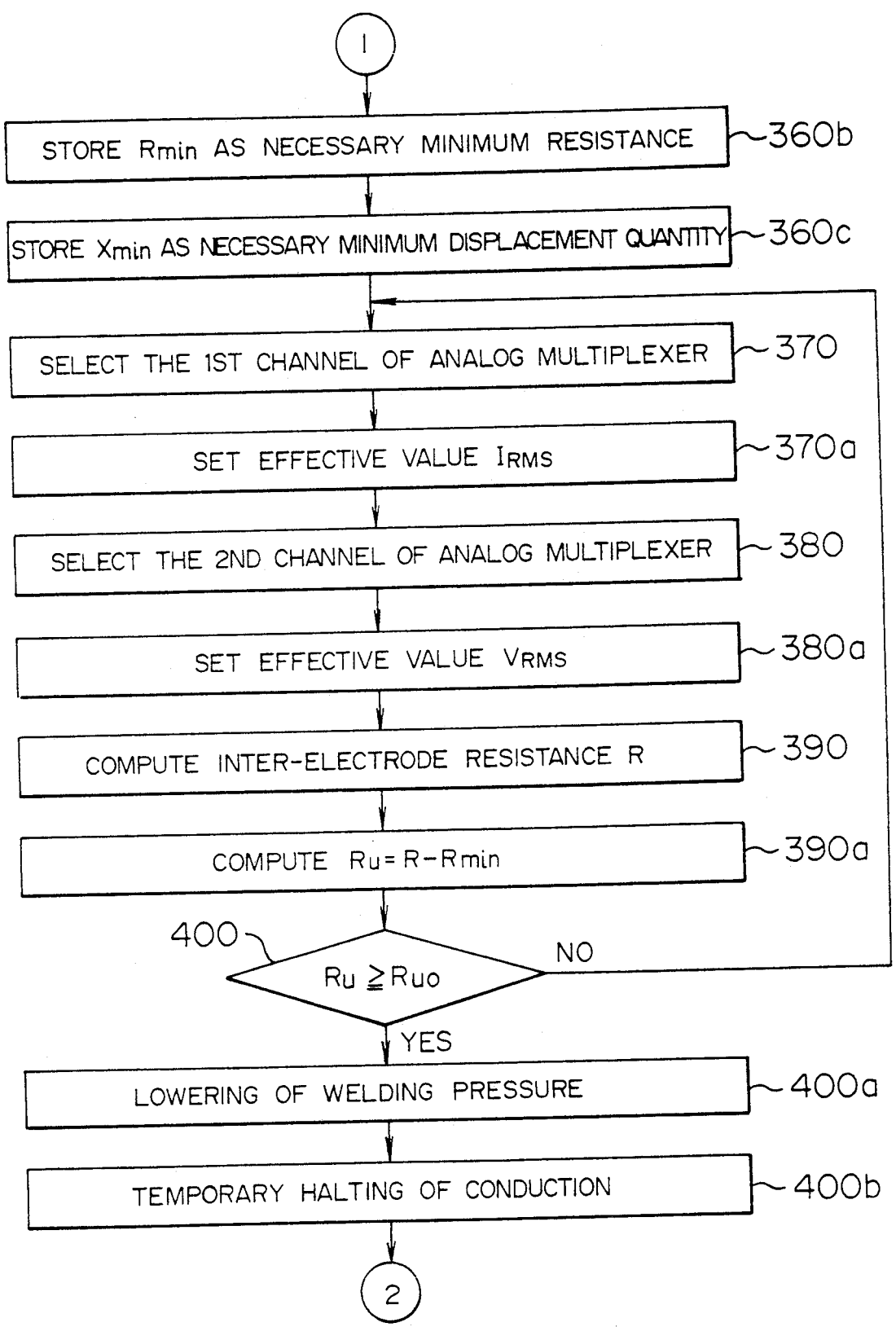
FIG. 13 is a flowchart sowing a middle part thereof.
Figure 14:
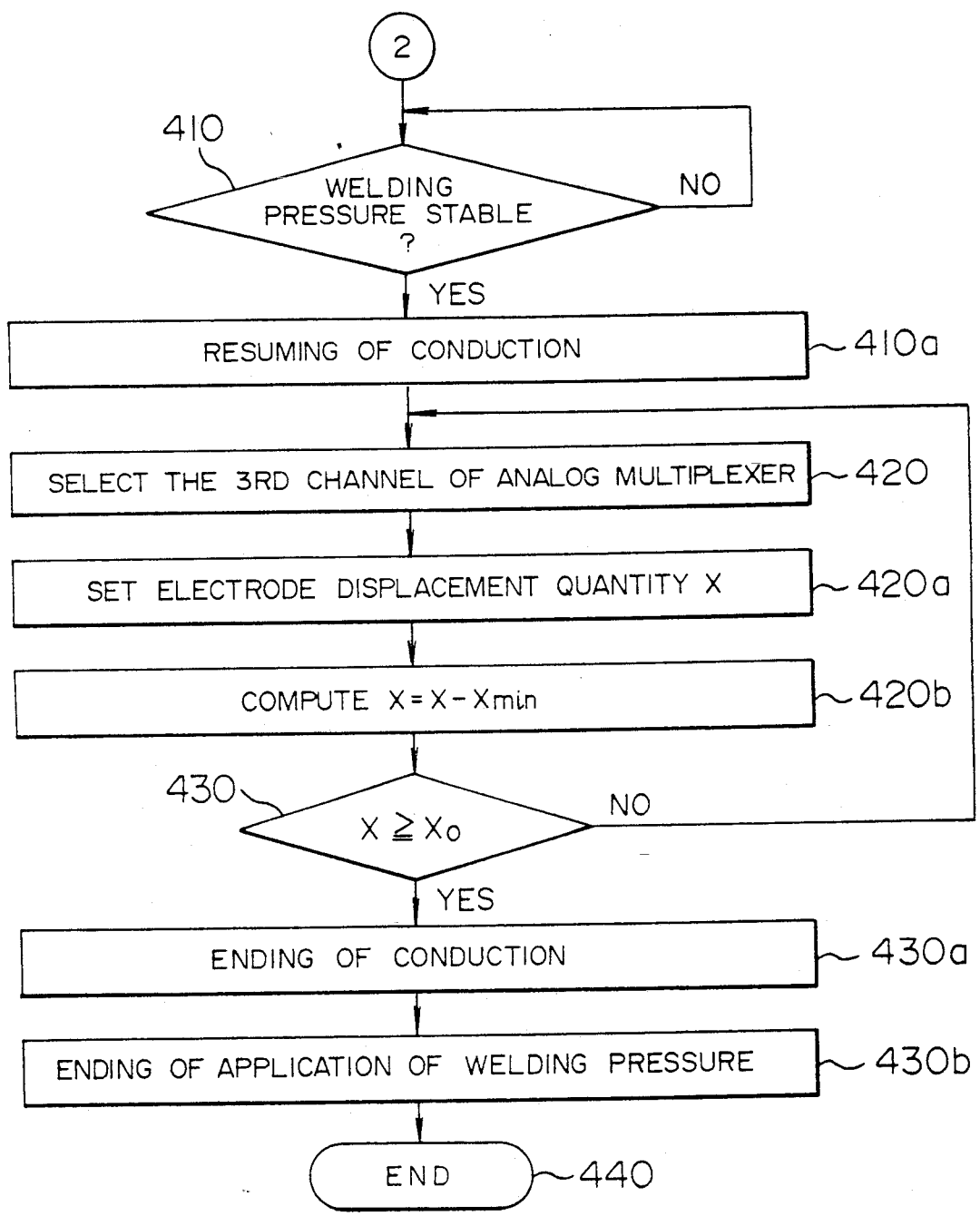
FIG. 14 is a flowchart showing a last part thereof.

An analog multiplexer 230 sequentially selects the filter current signal, the filter voltage signal and the filter displacement quantity signal respectively from the LPFs 220a, 220b, 220c under the control of a microcomputer 250 which will be mentioned alter. The analog multiplexer 230 then outputs these signals to an A-D converter 240. In such a case, the filter current signal from the LPF 220a is outputted via a first channel 1ch of the analog multiplexer 230. The filter voltage signal from the LPF 220b is outputted via a second channel 2ch of the analog multiplexer 230. Further, the filter displacement quantity signal from the LPF 220c is outputted via a third channel 3ch of the analog multiplexer 230. The A-D converter 240 sequentially effects digital conversions of the filter current signal, the filter voltage signal and the filter displacement quantity signal from the analog multiplexer 230 into a digital current signal, a digital voltage signal and a digital displacement quantity signal. The microcomputer 250 executes a computer program in cooperation with the A-D converter 240 in conformity with flowcharts of FIGS. 12~14. During this execution, the microcomputer 250 performs an arithmetic process needed for the control of a D-A converter 260. However, the computer program described above is previously stored in a ROM of the microcomputer 250.

The D-A converter 260 performs an analog conversion of welding pressure data outputted, as will be stated later, from the microcomputer 250. The D-A converter 260 outputs the data as a welding pressure output signal to a driving circuit 270a. The driving circuit 270a drives the proportional control valve 50 to set a valve opening thereof to a value corresponding to the value of the welding pressure output signal in response to a welding pressure output signal from the D-A converter 260. The driving circuit 270b drives the relay 60a to selectively excite the relay coil Ry thereof in response to a conduction output signal indicating the conduction from the welding power supply 60 that is generated from the microcomputer 250 as will be explained below. Other constructions are the same as those in the first embodiment.

In the thus constructed third embodiment, it is assumed that the welded material 30 is, as in the first embodiment shown in FIG. 1, mounted on the mounting surface 21 of the lower electrode 20 under the pressuring surface 11 of the upper electrode 10 of the resistance welding machine M. It is also presumed that the welding pressure P on the welded material 30 and the welding current from the welding power supply 60 are both set to zero. Thus, the control unit Eb is put into the active state in the resistance welding of the welded material 30. Then, the microcomputer 250 starts executing the computer program in accordance with the flowcharts of FIGS. 12~14 in step 300. Hereupon, the microcomputer 250 sets the welding pressure P to a predetermined initial welding pressure value (see t=t1 in FIG. 1) enough to exfoliate the coating of a coated conductor 30b in step 310. The microcomputer 250 then outputs the welding pressure P as welding pressure data.

Then, the D-A converter 260 analog-converts the welding pressure data given from the microcomputer 250 and outputs the data as a welding pressure output signal. In response to this action, a driving circuit 270a drives the proportional control valve 50 to set a valve opening thereof to a value corresponding to the value (the above-mentioned initial welding pressure value) of the welding pressure output signal. Therefore, the proportional control valve 50 serves to pressure-feed the air flow from a pneumatic source 50a to the air cylinder 40 in accordance with the valve opening thereof. Besides, this air cylinder 40 moves down the upper electrode 10 in accordance with the air flow fed from the proportional control valve 50. The air cylinder 40 starts exerting the welding pressure P (=the initial welding pressure value described above) as a value enough to peel off the coating on the welded material 30. At this moment, the displacement quantity detection circuit 90 detects and outputs an electrode displacement quantity X (see t=t0 in FIG. 2) of the upper electrode 10. Subsequently, the microcomputer 250 executes an arithmetic necessary for initiating the conduction from the welding power supply 60 in step 310a and outputs a conduction output signal. Then, the driving circuit 270b excites the relay coil Ry of the relay 60a. Consequently, the relay 60a closes the relay switch Y. In response to this action, the conduction of the welding current I from the welding power supply 60 occurs through the power supply conductor 61, the upper electrode 10, the welded material 30, the lower electrode 20 and the power supply conductor 62. At this time, the welding current I is detected by the welding current detection circuit 70. Simultaneously, the inter-electrode voltage V between the upper and lower electrodes 10, 20 is detected by the voltage detection circuit 80.

When the arithmetic in step 310a is thus ended off, the microcomputer 250 selects the first channel 1ch of the analog multiplexer 230 in step 320. In response to this selection, the analog multiplexer 230 outputs the filter current signal to the A-D converter 240 from the LPF 220a via the first channel 1ch. Then, this A-D converter 240 digital-converts the same filter current signal into a digital current signal and outputs it to the microcomputer 250. The microcomputer 250 therefore sets a value of the same digital current signal as an effective value IRMS in step 320a. Subsequently, the microcomputer 250 selects the second channel 2ch of the analog multiplexer 230 in step 330. Then, the analog multiplexer 230 outputs the filter voltage signal to the A-D converter 240 from the LPF 220b via the second channel 2ch.

Then, this A-D converter 240 digital-converts the same filter voltage signal into a digital voltage signal and outputs it to the microcomputer 250. The microcomputer 250 therefore sets a value of the same digital voltage signal as an effective value VRMS in step 330a. Further, the microcomputer 250 selects the third channel 3ch of the analog multiplexer 230 in step 340. The analog multiplexer 230 outputs the filter displacement quantity signal to the A-D converter 240 from the LPF 220c via the third channel 3ch. Then, this A-D converter 240 digital-converts the same filter displacement quantity signal into a digital displacement quantity signal and outputs it to the microcomputer 250. The microcomputer 250 therefore sets a value of the same digital displacement quantity signal as an electrode displacement quantity X in step 340a.

Thereafter, in step 350, the microcomputer 250 computes the inter-electrode resistance R between the upper and lower electrodes 10, 20 on the basis of the effective value IRMS obtained in step 320a and the effective value VRMS obtained in step 330. Based on the fact that this inter-electrode resistance R is larger than an initial resistance value Rini in step 300, the microcomputer 250 makes a judgment of [NO]. further in step 360a, the microcomputer 250 sets the inter-electrode resistance R as a present-stage minimum resistance Rmin in step 350. Hereafter, the arithmetic operations for a circulation through steps 320~360a are repeated substantially in the same way. Note that as in the first embodiment, both of the inter-electrode resistance R and the electrode displacement quantity X start decreasing in such a course. Hence, this implies an onset of the exfoliating process of the coating 33 of the coated wire 30a.

During such repetitive arithmetic processes, the latest inter-electrode resistance R instep 350 coincides with the minimum resistance Rmin in step 360a just before it. If so, the microcomputer 250 makes a judgment of [YES] in step 360. In step 360b, the same latest inter-electrode resistance R is temporarily stored as the minimum resistance Rmin. Besides, in step 360b, the microcomputer 250 determines, as a minimum displacement quantity Xmin, the latest electrode displacement quantity X in step 340a that corresponds to the same minimum resistance Rmin and temporarily stores the minimum displacement quantity Xmin.

Subsequently, in steps 370, 370a, 380, 380a, 390, the microcomputer 250 performs the same arithmetic operations as those in foregoing steps 320, 320a, 330, 330a, 350 in cooperation with the analog multiplexer 230 and the A-D converter 240. Thus, the microcomputer 250 sets the effective values IRMS, VRMS and computes the inter-electrode voltage R. Thereafter, the microcomputer 250 computes a difference between the inter-electrode resistance R in step 390 and the minimum resistance Rmin in step 360a. The microcomputer 250 sets this difference as a rising resistance RU. In next step 400, the same rising resistance RU is comparatively judged with respect to the set rising resistance value RUO stated in the first embodiment. In the third embodiment, however, the set rising resistance value RUO is stored beforehand in the ROM of the microcomputer 250. At the present stage, the rising resistance RU in step 390a is smaller than the set rising resistance value RUO. Therefore, the microcomputer 250 makes a judgment of [NO] in step 400 to return the computer program to step 370. Hereinafter, the arithmetic operations for a circulation through steps 370~400 are repeated.

During a repetition of such arithmetic operations, if the rising resistance RU in step 390a is equal to or larger than the set rising resistance value RUO, the microcomputer 250 makes a judgment of [YES] in step 400. The microcomputer 250 executes an arithmetic to lower the welding pressure P on the welded material 30 by a predetermined welding pressure width from the initial welding pressure value (i.e., the coating exfoliating value) in step 400a. The microcomputer 250 outputs a difference between the predetermined welding pressure value and the predetermined welding pressure width as lowered welding pressure data. Besides, in step 400b, the microcomputer 250 effects an arithmetic to temporarily halt the conduction from the welding power supply 60, thereby temporarily stopping the output of conduction output signals.

Then, the D-A converter 260 analog-converts the lowered welding pressure data from the microcomputer 250 into a welding pressure output signal and outputs it. In response to this action, the driving circuit 270a drives the proportional control valve 50 to reduce the valve opening thereof down to a value corresponding to the difference between the predetermined welding pressure value and the predetermined welding pressure width. Consequently, the proportional control valve 50 reduces the air flow to the air cylinder 40 from the pneumatic source 50a in accordance with the decreased valve opening. The air cylinder 40 lowers the welding pressure on the welded material 30 through the upper electrode 10 in accordance with the reduction of the same air flow. Concomitantly, the decrease in the electrode displacement quantity X ceases. Further, the temporary halt of the output of the conduction output signals from the microcomputer 250 is accompanied by a temporary demagnetization of the relay coil Ry of the relay 60a by the driving circuit 270b. Therefore, the output of the welding current I from the welding power supply 60 is temporarily stopped.

Thereafter, with a passage of a predetermined time (stored beforehand in the ROM of the microcomputer 250) necessary for stabilizing the welding pressure P with a completion of reduction thereof, the microcomputer 250 makes a judgment of[YES] in step 410. The microcomputer 250 performs an arithmetic to resume the conduction from the welding power supply 60 in step 410a and outputs again the conduction output signal. In consequence, the relay 60a is driven by the driving circuit 270b. The relay 60a excited by the relay coil Ry thereof closes the relay switch Y to output again the welding current I from the welding power supply 60. The conduction of the welding current I again takes place through the power supply conductor 61, the upper electrode 10, the welded material 30, the lower electrode 20 and the power supply conductor 62. It therefore follows that the operation shifts to the welding process of the welded material 30 after the coating has been exfoliated as in the first embodiment.

In such a course, as in the first embodiment, the welding between the terminal and the tip part of the coating-exfoliated wire 32 from the coated wire 30b progresses under the stabilized condition where the welding pressure P is lowered as shown above. The inter-electrode resistance R decreases rectilinearly on one hand, and the electrode displacement quantity X is reduced rectilinearly on the other hand. At such a stage, after performing the arithmetic in step 410a, the microcomputer 250 selects the third channel 3ch of the analog multiplexer 230 in step 420. Then, the analog multiplexer 230 outputs, to the A-D converter 240, the displacement quantity filter signal transmitted from the LPF 220c. This A-D converter 240 digital-converts the same displacement quantity filter signal into a digital displacement quantity signal and outputs it to the microcomputer 250.

Subsequently, the microcomputer 250 sets a value of the same digital displacement quantity signal as an electrode displacement quantity X in step 420a. In step 420b, the microcomputer 250 computes a difference between the same electrode displacement quantity X and the minimum displacement quantity Xmin in step 360c. This arithmetic difference is updated as the electrode displacement quantity X. Then, the microcomputer 250 makes a judgment of [NO] in step 430 on the basis of the fact that the same updated electrode displacement quantity X is smaller than the set electrode displacement quantity Xo stated in the first embodiment. The computer program goes back to step 420. The set electrode displacement quantity Xo is, however, previously stored in the ROM of the microcomputer 250.

Hereafter, the latest updated electrode displacement quantity X is equal to or greater than the set electrode displacement quantity Xo during a repetition of the arithmetic operations for a circulation through steps 420~430. Then, the microcomputer 250 makes a judgment of [YES] in step 430. The microcomputer 250 finishes outputting the conduction output signal to end off the output of the welding current I from the welding power supply 60 in step 430a. Further, the microcomputer 250 finishes outputting the welding pressure output signal to end off the pressurization on the welded material 30 through the upper electrode 10 in step 430b. Then, the driving circuit 270b demagnetizes the relay coil Ry of the relay 60a with the halt of the output of the conduction output signal from the microcomputer 250. Upon opening the relay switch Y, the relay 60a finishes outputting the welding current I from the welding power supply 60. Besides, the driving circuit 270a drives the proportional control valve 50 to make its valve opening zero with an end of the output of the welding pressure signal from the microcomputer 250. The pressurization through the upper electrode 10 is thereby ended off. Other actions are the same as those in the first embodiment. Therefore, the same effects as those in the first embodiment can be attained even by utilizing the above-mentioned arithmetic operations by the microcomputer 250.

Figure 15:
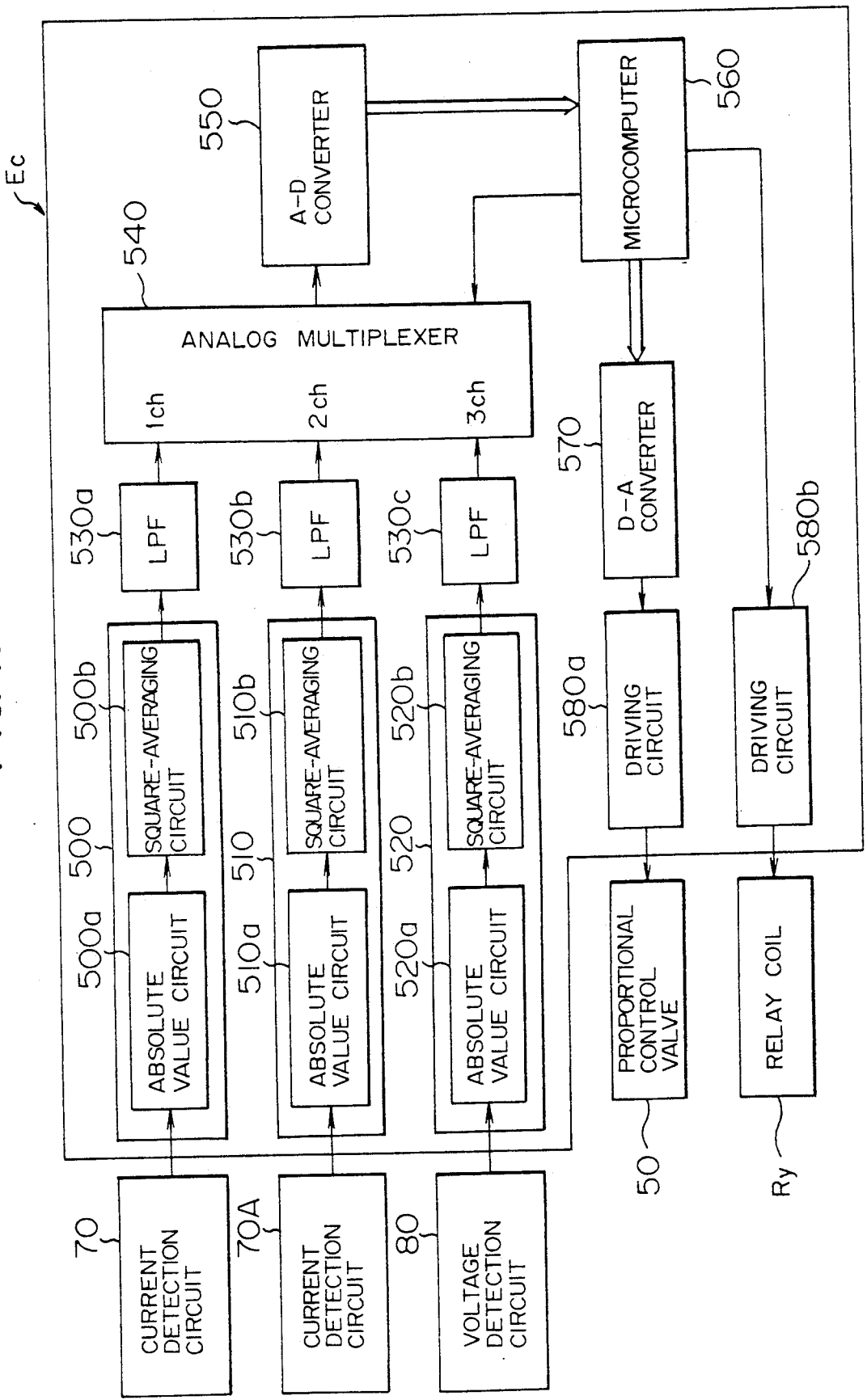
FIG. 15 is a block circuit diagram showing the principal portion of a fourth embodiment of the present invention.

Next, a fourth embodiment of the present invention will be described. The fourth embodiment is characterized in terms of construction by adopting a control unit Ec as shown in FIG. 15 in place of the control unit Ea stated in the second embodiment. The control unit Ec includes effective value arithmetic circuits 500, 510, 520 connected respectively to the welding current detection circuit 70, the current detection circuit 70A and the voltage detection circuit 80 described in the first embodiment. The effective value arithmetic circuit 500 is composed of an absolute value circuit 500a and a square-averaging circuit 500b having the same constructions and functions as those of the absolute value circuit 200a and the square-averaging circuit 200b of the effective value arithmetic circuit 200 describe din the third embodiment. Thus, the absolute value circuit 500a takes an absolute value of the detected welding current from the welding current detection circuit 70 and generates an absolute value signal. The square-averaging circuit 500b effects square-averaging of the absolute value signals given from the absolute value circuit 500a. The circuit square-averaging circuit 500b computes an effective value (corresponding to the effective value IRMS of the welding current explained in the second embodiment) from a square-averaged result thereof and outputs it in the form of a welding current effective value signal.

The effective value arithmetic circuit 510 comprises an absolute value circuit 510a connected to the voltage detection circuit 70A and a square-averaging circuit 510b connected to this absolute value circuit 510a. Thus, the absolute value circuit 510a takes an absolute value of the detected main current and generates an absolute value signal. The square-averaging circuit 510b performs square-averaging of the absolute value signals given from the absolute value circuit 510a. This square-averaging circuit 510b computes an effective value (corresponding to the effective value IMRMS of the detected main current stated in the second embodiment) from a square-averaged result thereof and outputs it in the form of a main current effective value signal. The effective value arithmetic circuit 520 is composed of an absolute value circuit 520a and a square-averaging circuit 520b having the same constructions and functions as those of the absolute value circuit 210a and the square-averaging circuit 210b of the effective value arithmetic circuit 2210 described in the third embodiment. Thus, the absolute value circuit 520a takes an absolute value of the inter-electrode voltage V from the voltage detection circuit 80 and generates an absolute value signal. The square-averaging circuit 520b squareaverages the absolute value signals transmitted form the absolute value circuit 520. The square-averaging circuit 520b computes an effective value (corresponding to the effective value VRMS of the inter-electrode voltage mentioned in the second embodiment) from a square-averaged result thereof and outputs it as an inter-electrode voltage effective value signal.

Further, the control unit Ec includes low-pass filters 530a, 530b and 530c (hereafter referred to as LPF 530a, LPF 530b and LPF 530c) connected respectively to the effective value arithmetic circuits 500, 510, 520. Cut-off frequencies Fc of these LPFs 530a, 530b, 530c are all set to 60 (Hz). Thus, the LPF 530a eliminates a frequency component higher than 60 (Hz) out of frequency components of the welding current effective value signals transmitted from the square-averaging circuit 500b of the effective value arithmetic circuit 500. The LPF 530a treats the remaining frequency components to generate filter current signals. The LPF 530b removes a frequency component higher than 60 (Hz) out of the frequency components of the main current effective value signals transmitted from the square-averaging circuit 510b of the effective value arithmetic circuit 510. The LPF 530b treats the remaining frequency components to generate filter main current signals. Further, the LPF 530c removes a frequency component higher than 60 (Hz) out of the frequency components of the voltage effective value signals given from the effective value arithmetic circuit 520. The LPF 530c treats the remaining frequency components to generate filter voltage signals.

Figure 16:
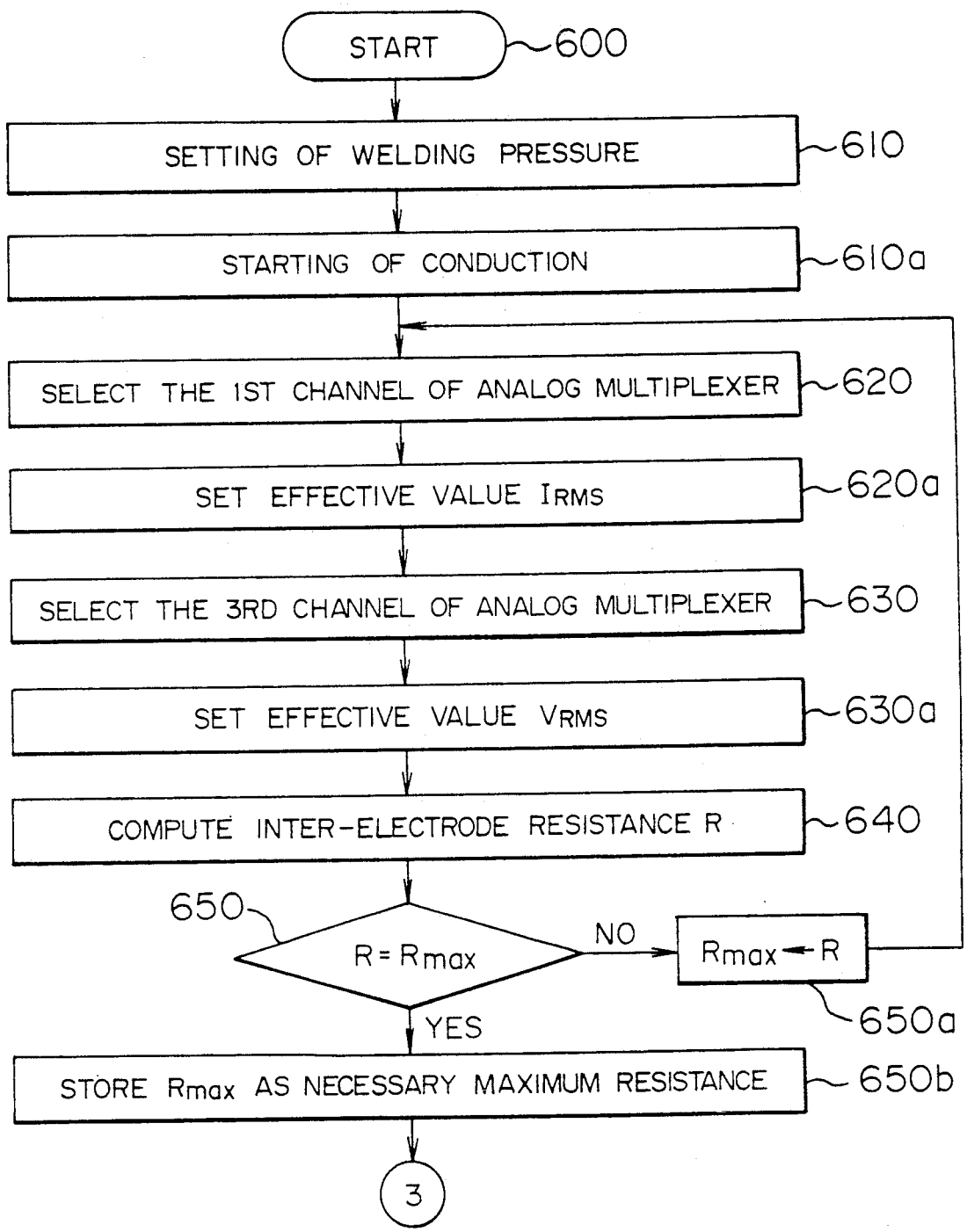
FIG. 16 is a flowchart showing a first part of the actions of the microcomputer in FIG. 15.
Figure 17:
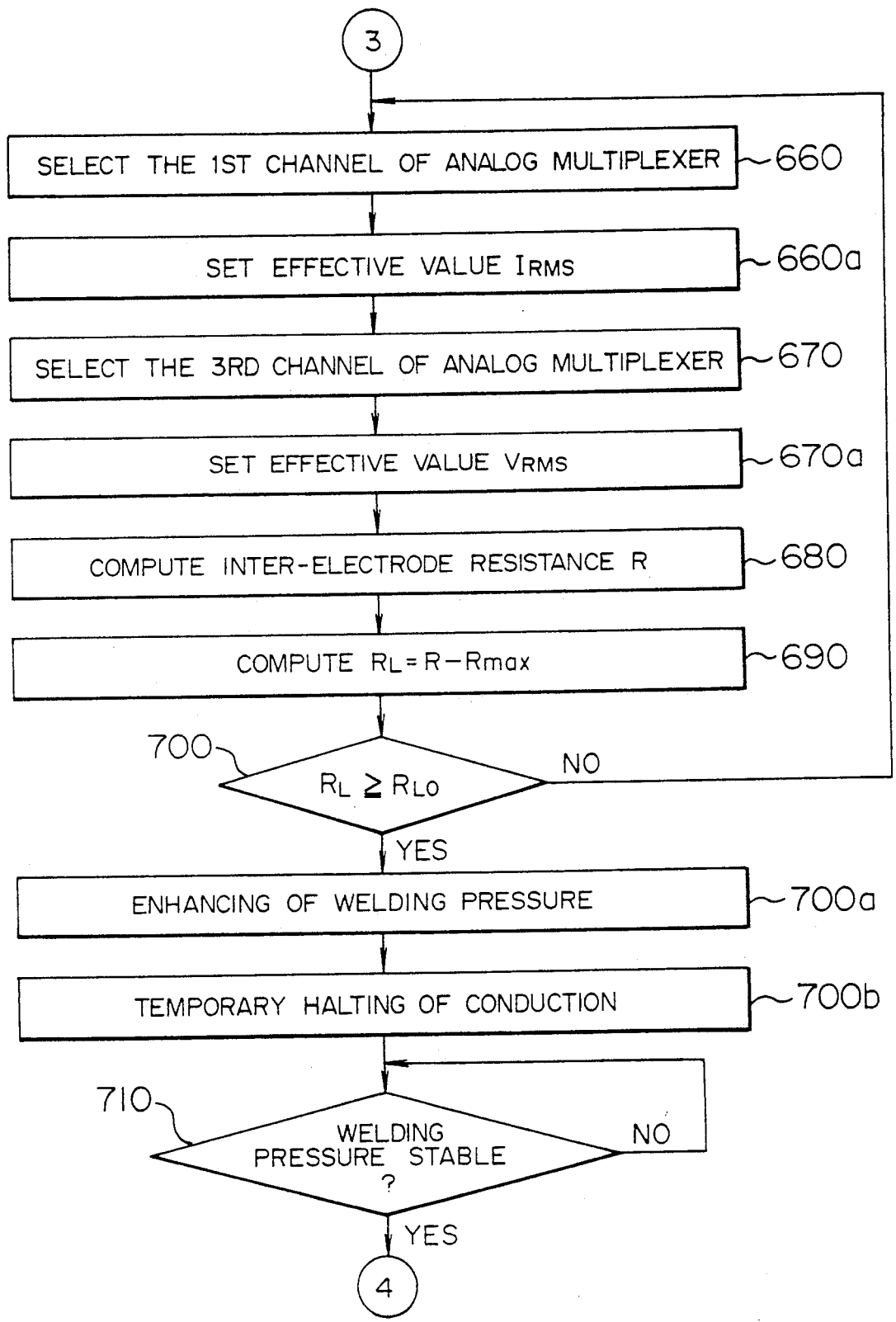
FIG. 17 is a flowchart showing a middle part thereof.
Figure 18:
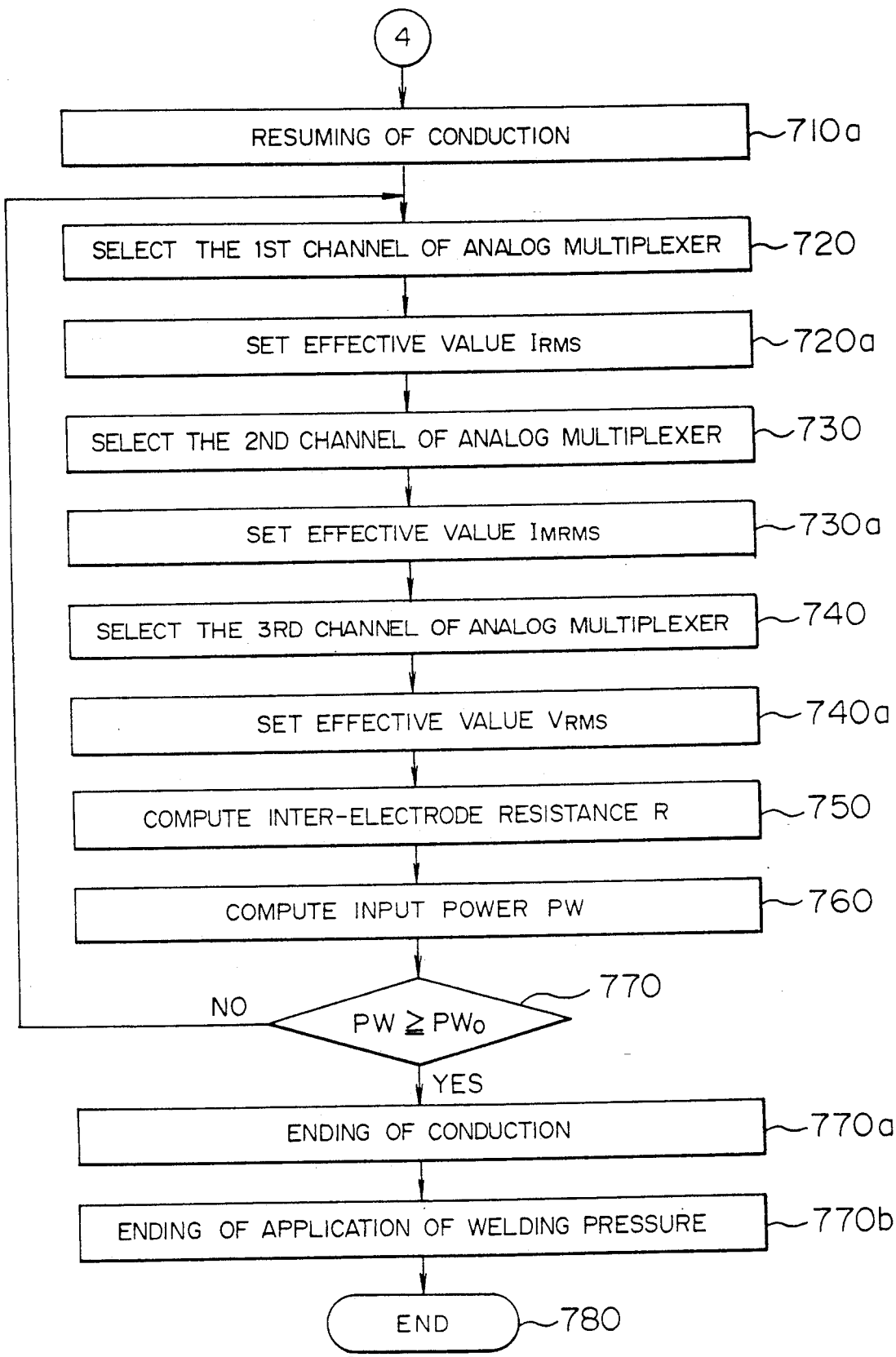
FIG. 18 is a flowchart showing a last part thereof.

An analog multiplexer 540 sequentially selects the filter current signal, the filter main current signal and the filter voltage signal respectively from the LPFs 530a, 530b, 530c under the control of a microcomputer 560 which will be mentioned alter. The analog multiplexer 540 then outputs these signals to an A-D converter 550. In such a case, the filter current signal from the LPF 530a is outputted via a first channel 1ch of the analog multiplexer 540. The filter main current signal from the LPF 530b is outputted via a second channel 2ch of the analog multiplexer 540. Further, the filter voltage signal from the LPF 530c is outputted via a third channel 3ch of the analog multiplexer 540. The A-D converter 550 sequentially effects digital conversions of the filter current signal, the filter main current signal and the filter voltage signal from the analog multiplexer 540 into a digital current signal, a digital main current signal and a digital voltage signal. The microcomputer 560 executes a computer program in cooperation with the A-D converter 550 in conformity with flowcharts of FIGS. 16~18. During this execution, the microcomputer 560 performs an arithmetic process needed for the control of a D-A converter 570. However, the computer program described above is previously stored in a ROM of the microcomputer 560.

The D-A converter 570 performs an analog conversion of welding pressure data outputted, as will be stated later, from the microcomputer 560. The D-A converter 570 outputs the data as a welding pressure output signal to a driving circuit 580a. The driving circuit 580a drives the proportional control valve 50 to set a valve opening thereof to a value corresponding to the value of the same welding pressure output signal in response to a welding pressure output signal from the D-A converter 570. The driving circuit 580b drives the relay 60a to selectively excite the relay coil Ry thereof in response to a conduction output signal indicating the conduction from the welding power supply 60 that is generated from the microcomputer 560 as will be explained below. Other constructions are the same as those in the second embodiment.

In the thus constructed fourth embodiment, it is assumed that the welded material 30A is, as in the first embodiment, mounted on the mounting surface of the lower electrode 20 under the pressuring surface of the upper electrode 10 of the resistance welding machine Ma. It is also presumed that the welding pressure P on the welded material 30A and the welding current from the welding power supply 60 are both set to zero. Thus, the control unit Ec is put into the active state in the resistance welding of the welded material 30A. Then, the microcomputer 560 starts executing the computer program in accordance with the flowcharts of FIGS. 16~18 in step 600. Hereupon, the microcomputer 560 sets the welding pressure P to a predetermined initial welding pressure value enough to exfoliate the coating of a coated conductor 30b in step 610. The microcomputer 560 then outputs the welding pressure P as welding pressure data.

Then, the D-A converter 570 analog-converts the welding pressure data given from the microcomputer 560 and outputs the data as a welding pressure output signal. In response to this action, a driving circuit 270a drives the proportional control valve 50 to set a valve opening thereof to a value corresponding to the value (the above-mentioned initial welding pressure value) of the same welding pressure output signal. Therefore, the proportional control valve 50 serves to pressure-feed the air flow from a pneumatic source 50a to the air cylinder 40 in accordance with the valve opening thereof. Besides, this air cylinder 40 moves down the upper electrode 10 in accordance with the air flow fed from the proportional control valve 50. The air cylinder 40 starts exerting the welding pressure P (=the initial welding pressure value described above) as a value enough to peel off the coating.

Subsequently, the microcomputer 560 executes an arithmetic necessary for initiating the conduction of the current from the welding power supply 60 in step 610a and outputs a conduction output signal. Then, the driving circuit 580b excites the relay coil Ry of the relay 60a. Consequently, the relay 60a closes the relay switch Y. In response to this action, the welding current I from the welding power supply 60 flows across the upper electrode 10 via the power supply conductor 61. Then, this inflow welding current I flows into the power supply conductor 62 after running across the lower electrode 20 via the intermediate electrode 10a and the short-circuit conductor 10b because of an insulating property of the coating of the coated wire 30b. At this time, the welding current I is detected by the welding current detection circuit 70. Simultaneously, the inter-electrode voltage V between the upper and lower electrodes 10, 20 is detected by the voltage detection circuit 80.

When the arithmetic in step 610a is thus ended off, the microcomputer 560 selects the first channel 1ch of the analog multiplexer 540 in step 620. In response to this selection, the analog multiplexer 540 outputs the filter current signal to the A-D converter 550 from the LPF 530a via the first channel 1ch. Then, this A-D converter 550 digital-converts the same filter current signal into a digital current signal and outputs it to the microcomputer 560. The microcomputer 560 therefore sets a value of the same digital current signal as an effective value IRMS in step 620a. Subsequently, the microcomputer 560 selects the third channel 3ch of the analog multiplexer 540 in step 630. Then, the analog multiplexer 230 outputs the filter voltage signal to the A-D converter 550 from the LPF 530c via the third channel 3ch. Then, this A-D converter 550 digital-converts the same filter voltage signal into a digital voltage signal and outputs it to the microcomputer 560. The microcomputer 560 therefore sets a value of the same digital voltage signal as an effective value VRMS in step 630a.

Thereafter, in step 640, the microcomputer 560 computes the inter-electrode resistance R between the upper and lower electrodes 10, 20 on the basis of the effective value IRMS obtained in step 620a and the effective value VRMS obtained in step 630a. Based on the fact that this inter-electrode resistance R is smaller than an initial resistance value Rini in step 600 at the present stage, the microcomputer 560 makes a judgment of [NO] in step 650. Further in step 650a, the microcomputer 560 sets the inter-electrode resistance R as a present-stage minimum resistance Rmax in step 650a and returns the computer program to step 620. Hereafter, the arithmetic operations for a circulation through steps 620~650a are repeated substantially in the same way. Note that in such a course, the inter-electrode resistance R increases as in the second embodiment, and this implies an onset of the exfoliating process of the coating of the coated wire 30b.

In such a state, when the latest inter-electrode resistance R in step 640 reaches the maximum resistance Rmax just before it in step 650a, the microcomputer 560 makes a judgment of [YES] in step 650. The microcomputer 560 temporarily stores the same maximum resistance Rmax. At this time, as in the second embodiment, the exfoliation of the coated wire 30b is started. consequently, the welding current flowing across the upper electrode 10 runs as a main current Im into the lower electrode 20 via the welded material 30A.

After effecting the arithmetic in step 650b, in steps 660, 660a, 670, 670a, 680, the microcomputer 560 performs the same arithmetic operations as those in steps 620~630a in cooperation with the analog multiplexer 540 and the A-D converter 550. The microcomputer 560 sets the effective values IRMS, VRMS and computes the inter-electrode resistance R. Thereafter in step 690, the microcomputer 560 computes a difference between the inter-electrode resistance R in step 680 and the maximum resistance Rmax in step 650b as the falling resistance RL mentioned in the second embodiment. At the present stage, the falling resistance RL in step 690 is smaller than the set falling resistance RLO mentioned in the second embodiment. Hence, the microcomputer 560 makes a judgment of [NO] in step 700 and returns the computer program to step 660. hereafter, the arithmetic operations for a circulation through steps 660~700 are similarly repeated. In accordance with the fourth embodiment, however, the set falling resistance RLO is stored beforehand in the ROM of the microcomputer 560.

During a repetition of such arithmetic operations, if the latest falling resistance RL in step 690 is equal to or larger than the set falling resistance RLO, the microcomputer 560 makes a judgment of [YES] in step 700. The microcomputer 560 executes an arithmetic to augment the welding pressure P on the welded material 30A by a predetermined welding pressure width in step 700a. The microcomputer 560 outputs a sum of the predetermined welding pressure value and the predetermined welding pressure width as increased welding pressure data. Besides, in step 700b, the microcomputer 560 effects an arithmetic needed for temporarily halting the conduction from the welding power supply 60, thereby temporarily stopping the output of conduction output signals.

Then, the D-A converter 570 analog-converts the increased welding pressure data from the microcomputer 560 into a welding pressure output signal and outputs it. In response to this action, the driving circuit 580a drives the proportional control valve 50 to increase the valve opening thereof up to a value corresponding to the sum of the predetermined welding pressure value and the predetermined welding pressure width. Consequently, as in the second embodiment, the proportional control valve 50 augments the air flow to the air cylinder 40 from the pneumatic source 50a in accordance with the increased valve opening. The air cylinder 40 further move down the upper electrode, corresponding to the augment in the same air flow, thereby increasing the welding pressure on the welded material 30A through the same upper electrode 10.

Thereafter, with a passage of a predetermined time (stored beforehand in the ROM of the microcomputer 560) necessary for stabilizing the welding pressure P with a completion of enhancement thereof, the microcomputer 560 makes a judgment of [YES] in step 710. The microcomputer 560 performs an arithmetic to resume the conduction from the welding power supply 60 in step 710a and outputs again the conduction output signal. In consequence, the relay 60a is driven by the driving circuit 580b. The relay 60a excited by relay coil Ry thereof closes the relay switch Y to output again the welding current I from the welding power supply 60. Hence, the welding current I from the welding power supply 60 is made to flow again as a main current into the lower electrode 20 via the upper electrode 10 and the welded material 30A. This implies a shift to the welding process of the welded material 30A after the coating has been exfoliated as in the second embodiment.

After the arithmetic operation in step 710a, the microcomputer 560 sets the effective value IRMS in the same way as the arithmetic operations in two steps 620, 620a in cooperation with the analog multiplexer 540 and the A-D converter 550 in two steps 720, 720a. Then, the microcomputer 560 selects the second channel 2ch of the analog multiplexer 540 in step 730. The analog multiplexer 540 outputs the filter main current signal to the A-D converter 550 from the LPF 530b via the second channel 2ch. Then, this Aa-D converter 550 digital-converts the same filter main current signal into a digital main current signal and outputs it to the microcomputer 560. The microcomputer 560 therefore sets a value of the same digital main current signal as an effective value IMRMS thereof in step 730a.

Subsequently, the microcomputer 560 sets the effective value VRMS by effecting the same arithmetic operations as those in two steps 630, 630a in cooperation with the analog multiplexer 540 and the A-D converter 550 in two steps 740, 740a. Thereafter, the microcomputer 560 conducts the same arithmetic operations as those in steps 750, 640. The microcomputer 560 thus computes the inter-electrode resistance R on the basis of the effective values IRMS. VRMS in steps 720a, 740a. Besides, in step 760, the microcomputer 560 computes the input power PW through a time-based integration of the product of the inter-electrode resistance R and a square of the effective value IMRMS in step 730a. At the present stage, the input power in step 760 is smaller than the set input power PWo stated in the second embodiment. The microcomputer 560 therefore makes a judgment of [NO] in step 770 and returns the computer program to step 720. Hereafter, the arithmetic operations for a circulation through steps 720~770 are repeated.

In such a course, the welding between the terminal 30c and the tip part of the coating-exfoliated wire 32 from the coated wire 30b progresses under the stabilized condition where the welding pressure P is enhanced as shown above. Thereafter, when the latest input power PW in step 760 exceeds the set input power PWo, the microcomputer 560 make a judgment of [YES] in step 770. In step 770a, the microcomputer 560 finishes outputting the conduction output signal to end off the output of the welding current I from the welding power supply 60. Besides, in step 770b, the output of the welding pressure signal is halted to stop the pressurization on the welded material 30A through the upper electrode 10. Then, the driving circuit 580b demagnetizes the relay coil Ry of the relay 60a with the halt of the output of the conduction output signal from the microcomputer 560. The same relay coil 60a works to finish the output of the welding power supply I with closing of the relay switch Y. Further, the driving circuit 580a drives the proportional control valve 50 to make its valve opening zero with an end of the output of the welding pressure output signal from the microcomputer 560. The pressurization through the upper electrode 10 is thereby finished. Other actions are the same as those in the second embodiment. The same effects as those in the second embodiment are thereby attainable even by utilizing the above-mentioned arithmetic operations by the microcomputer 560.

Incidentally, when embodying the present invention, there may be utilized a result of a vicinal-to-welding-part temperature of the coated wire that is detected by an infrared-ray thermometer 801 or the like and a result of a gas generated during the coat exfoliation that is detected by a gas sensor 802 in judging a timing of the coat exfoliation as described in the second or fourth embodiment discussed above.

Further, when embodying the present invention, the mutually continuous two inter-electrode resistances are compared in determining the minimum resistance Rmin (or the maximum resistance Rmax). When a difference therebetween is equal to or smaller than the predetermined difference, the inter-electrode resistance R just before it may be determined as the minimum resistance Rmin (or the maximum resistance Rmax).

Moreover, when embodying the present invention, the power supply frequency of the welding power supply 60 is not limited to 60 (Hz) but may be properly altered as the necessity arises.

Furthermore, when embodying the present invention, the judgment of [YES] in step 360 (see FIG. 12) in the third embodiment may be made based on the relationship of $R \geq Rmin$ in stead of $R = Rmin$. Besides, the judgment in step 650 (see FIG. 16) in the fourth embodiment may be made based on the relationship of $R \leq Rmax$ in stead of $R = Rmax$.

What is claimed is:

1. A method for welding together electrically conductive members, comprising the steps of:

a detecting step for detecting a removal of an electrically insulating member between a first electrically conductive member and a second electrically conductive member by detecting an increase in temperature of at least one of the first and second electrically conductive members, wherein the increase in temperature is measured from a temperature of a surface of the at least one of the first and second electrically conductive members, and a welding step for welding together the first electrically conductive member and the second electrically conductive member by passing an electricity through them to fix said first and second conductive members to each other, after the removal of the electrically insulating member therebetween is detected.

2. A method according to claim 1, wherein the increase in temperature is measured from an increase in electric resistance through the first and second electrically conductive members.

3. A method according to claim 1, wherein the removal of the electrically insulating member is performed by a force compressing the electrically insulating member between the first and second electrically conductive members.

4. A method according to claim 1, wherein the removal of the electrically insulating member is performed by a heat energy applied to the electrically insulating member.

5. A method according to claim 1, wherein the removal of the electrically insulating member is detected from the temperature increase of at least one of the first and second electrically conductive members to more than a predetermined temperature.

6. A method according to claim 5, wherein the temperature thereof is measured from a value of electric resistance through the first and second electrically conductive members.

7. A method according to claim 1, wherein the detecting step includes a time in which at least one of the first and second electrically conductive members is electrically energized to generate a heat energy for heating the electrically insulating member before the removal of the electrically insulating member is detected.

8. A method according to claim 1, wherein the detecting step includes a time in which both of the first and second electrically conductive members are prevented by the electrically insulating member from being electrically energized, and the electrically insulating member is compressed between the first and second electrically conductive members, before the removal of the electrically insulating member is detected.

9. A method according to claim 1, wherein the removal of the electrically insulating member is detected from a time which is more than a predetermined time and in which the temperature increase of at least one of the first and second electrically conductive members more than a predetermined temperature is kept.

10. A method according to claim 1, wherein an evaporative gas is generated from the electrically insulating member when the electrically insulating member is heated at more than a predetermined temperature.

11. A method according to claim 1, wherein an electric resistance of each of the first and second electrically conductive members increases according to an increase in temperature thereof.

12. A method according to claim 1, wherein a force for compressing the electrically insulating member between the first electrically conductive member which is prevented by the electrically insulating member from being energized electrically in the detecting step and the second electrically conductive member which is energized electrically in the detecting step is decreased after the removal of the electrically insulating member is detected.

13. A method according to claim 1, wherein a force for compressing the electrically insulating member between the first and second electrically conductive members both of which are prevented by the electrically insulating member from being energized electrically in the detecting step is increased after the removal of the electrically insulating member is detected.

14. A method according to claim 1, wherein an electrical energizing of at least one of the first and second electrically conductive members is weakened temporarily between the detecting step and the welding step.

15. A method according to claim 1, wherein the welding step is started after an increase in temperature of at least one of the first and second electrically conductive members in comparison with the minimum temperature thereof in the detecting step.

16. A method according to claim 1, wherein the welding step is finished when a width through the first and second electrically conductive members is decreased to a predetermined width.

17. A method according to claim 1, wherein the welding step is finished when a width through the first and second electrically conductive members is decreased by a predetermined degree relative to a width therethrough measured when a start of direct contact between the first and second electrically conductive members is detected.

18. A method according to claim 1, wherein the welding step is finished when a predetermined heat energy value is applied to the first and second electrically conductive members to be welded together.

19. A method for welding together electrically conductive members, comprising the steps of:
a detecting step for detecting a removal of an electrically insulating member between a first electrically conductive member and a second electrically conductive member, by heating the electrically insulating member and detecting an evaporative gas from the electrically insulating member which is heated; and
a welding step for welding together the first electrically conductive member and the second electrically conductive member by passing an electricity through them to fix said first and second conductive members to each other, after the removal of the electrically insulating member therebetween is detected.

20. A method for welding together electrically conductive members, comprising the steps of:
a detecting step for detecting a removal of an electrically insulating member between a first electrically conductive member and a second electrically conductive member,
wherein the removal of the electrically insulating member is detected from the temperature increase of at least one of the first and second electrically conductive members to more than a predetermined temperature determined by measuring a temperature of a surface of the at least one of the first and second electrically conductive members, and
a welding step for welding together the first electrically conductive member and the second electrically conductive member by passing an electricity through them to fix said first and second conductive members to each other, after the removal of the electrically insulating member therebetween is detected.

21. A method according to claim 20, wherein the removal of the electrically insulating member is detected from an electric resistance value through the first and second electrically conductive members less than a predetermined value.

22. A method for welding together electrically conductive members, comprising the steps of:
a detecting step for detecting a removal of an electrically insulating member between a first electrically conductive member and a second electrically conductive member, wherein the removal of the electrically insulating member is detected from an increase in direct contact area between the first and second electrically conductive members by a predetermined amount in comparison with the detected minimum direct contact area therebetween in the detecting step, and
a welding step for welding together the first electrically conductive member and the second electrically conductive member by passing an electricity through them to fix said first and second conductive members to each other, after the removal of the electrically insulating member therebetween is detected.

23. A method for welding together electrically conductive members, comprising the steps of:
a detecting step for detecting an increase in electric resistance through a first and a second electrically conductive member from an initial electric resistance by a predetermined amount to determine a removal of an electrically insulating thermoplastic member between the first electrically conductive member and the second electrically conductive member, and
a welding step for welding together the first electrically conductive member and the second electrically conductive member by passing an electrical current therethrough, after the removal of the electrically insulating thermoplastic member therebetween is detected.

24. A method according to claim 23, wherein the removal of the electrically insulating member is detected from an increase in electric resistance value through the first and second electrically conductive members in comparison with the minimum electric resistance value therethrough in the detecting step.

25. A method according to claim 23, wherein the welding step is started after a decrease in electric resistance through the first and second electrically conductive members in comparison with the maximum electric resistance therethrough in the detecting step.

26. A method according to claim 23, wherein the removal of the electrically insulating thermoplastic member is detected from the increase in electric resistance to more than a predetermined value.

27. A control method for resistance welding, comprising the steps of:
a coating removal step in which a pressing force and a welding electric current are supplied to a first electrically conductive member with a coating thereon and to a second electrically conductive member, by electrodes of a resistance welding machine, and detecting a welding condition varying relative to a proceeding of removal of the coating to determine whether the removal of the coating has reached a predetermined degree, and a welding step, executed after the removal of the coating reaches the predetermined degree, wherein the welding condition in the coating removal step and the welding condition in the welding step are controlled independent of each other.

28. A control method according to claim 27, wherein the welding condition is an electric resistance value between the electrodes.

29. A control method according to claim 27, wherein the removal of the coating is judged to reach the predetermined degree when the welding condition varies by a predetermined value after reaching an extreme value.

30. A control method according to claim 27, wherein the second electrically conductive member has a U-shaped bent portion, the first electrically conductive member has an electrically conductive wire covered by the coating, which is an electrically insulating material, and the first electrically conductive member is caught in the U-shaped bent portion.

31. A control method according to claim 27, wherein the second electrically conductive member has a plane surface, the first electrically conductive member has an electrically conductive wire covered by the coating, which is an electrically insulating material, and the first electrically conductive member is arranged on the plane surface.

32. A control method for resistance welding, comprising the steps of:

a coating removal step in which a pressing force and a welding electric current are supplied by electrodes of a resistance welding machine to a first electrically conductive member with a coating of electric insulation thereon and a second electrically conductive member with a U-shaped bent portion catching therein the first electrically conductive member;

detecting a welding condition varying relative to a proceeding of removal of the coating to determine whether the removal of the coating has reached a predetermined degree, and a welding step carried out after the removal of the coating reaches the predetermined degree, wherein the welding condition in the coating removal step and the welding condition in the welding step are controlled independently of each other in a way such that the pressing force in the coating removal step is larger than the pressing force in the welding step.

33. A control method for resistance welding, comprising the steps of:

supplying a pressing force and a welding electric current to a first electrically conductive member with a coating thereon and a second electrically conductive member by electrodes of a resistance welding machine, detecting a welding condition varying, relative to a progress of removal of the coating, determining whether the removal of the coating has reached a predetermined degree, stopping temporarily the supply of welding electric current and decreasing the pressing force in response to the removal of the coating reaching the predetermined degree, subsequently restarting the supply of welding electric current to weld together the first and second electrically conductive members, and finishing the supply of pressing force and welding electric current when an electric energy between the electrode becomes substantially constant.

34. A control method according to claim 33, wherein the second electrically conductive member has a U-shaped bent portion, the first electrically conductive member has an electrically conductive wire covered by the coating, which is an electrically insulating material, and the first electrically conductive member is caught in the U-shaped bent portion.

35. A control method according to claim 33, wherein the removal of the coating is judged to reach the predetermined degree when the welding condition varies by a predetermined value after reaching an extreme value.

36. A control method for resistance welding, comprising the steps of:

supplying a pressing force to a first electrically conductive member with a coating thereon and a second electrically conductive member by electrodes of a resistance welding machine, and supplying a welding electric current to the electrodes and a short-circuiting electrically conductive member for connecting electrically the electrodes to each other, so that a removal of the coating proceeds, detecting a welding condition varying relative to the progress of removal of the coating, determining whether the removal of the coating has reached a predetermined degree, stopping temporarily the supply of welding electric current and increasing the pressing force in response to the removal of the coating reaching the predetermined degree, subsequently restarting the supply of welding electric current to weld together the first and second electrically conductive members, and terminating the supply of pressing force and welding electric current when an electric energy between the electrode becomes substantially constant.

37. A control method according to claim 36, wherein the second electrically conductive member has a plane surface, the first electrically conductive member has an electrically conductive wire covered by the coating, which is of electrical insulation, and the first electrically conductive member is arranged on the plane surface.

38. A control method according to claim 36, wherein the removal of the coating is judged to reach the predetermined degree when the welding condition varies by a predetermined value after reaching an extreme value.

39. A method for detecting a removal of a coating covering an electrically conductive member during resistance welding in which a pressing force and a welding electric current are supplied to the electrically conductive member and another electrically conductive member by electrodes, comprising the steps of:

detecting a welding condition varying relative to a progress of the removal caused by the pressing force and welding electric current, and judging the removal of the coating to reach a predetermined degree when the welding condition varies by a predetermined value after reaching an extreme value.

40. A method according to claim 49, wherein the welding condition is an electric resistance between the electrodes.

41. A resistance welding control device for an electrically conductive member with a coating thereon, comprising:

at least two electrodes, pressing force supplying means for supplying a pressing force to the electrically conductive member and another electrically conductive member through the electrodes, welding electric current supplying means for supplying a welding electric current to the electrically conductive members through the electrodes, means for detecting a welding condition varying relative to a progress of removal of the coating and for determining, from the welding condition, whether the removal of the coating reaches a predetermined degree, and control means for controlling the welding condition until the removal of the coating reaches the predetermined degree and the welding condition after the removal of the coating reaches the predetermined degree independent of each other.

42. A resistance welding device for an electrically conductive member with a coating thereon, comprising:

at least two electrodes, pressing force supplying means for supplying a pressing force to the electrically conductive member and another electrically conductive member through the electrodes, welding electric current supplying means for supplying a welding electric current to the electrically conductive members through the electrodes, detecting means for detecting a welding condition varying in accordance with a progress of removal of the coating, first means for determining whether the detected welding conditions has reached a first value, and second means for determining the removal of the coating to reach a predetermined degree when the detected welding condition varies by a predetermined value after the detected welding condition reaches the first value, first control means for temporarily stopping the supply of welding electric current and decreasing the pressing force in response to the determination by the second means, and second control means for restarting subsequently the supply of welding electric current to weld together the first and second electrically conductive members, and for finishing the supply of pressing force and welding electric current when an electric energy between the electrode becomes substantially constant.

43. A resistance welding device for an electrically conductive member with a coating thereon, comprising:

at least two electrodes, a short-circuit electrically conductive member for connecting electrically the electrodes to each other, pressing force supplying means for supplying a pressing force to the electrically conductive member and another electrically conductive member through the electrodes, welding electric current supplying means for supplying a welding electric current to the electrodes through the short-circuit electrically conductive member, and the electrically conductive members, detecting means for detecting a welding condition varying in accordance with a removal of the coating, first means for determining whether the detected welding condition reaches an extreme value, and second means for determining that the coating removal has reached a predetermined degree when the detected welding condition varies by a predetermined value after the detected welding condition reaches the extreme value, first control means for stopping temporarily the supply of welding electric current and increasing the pressing force in response to the determination by the second means, and second control means for restarting subsequently the supply of welding electric current to weld together the first and second electrically conductive member, and for finishing the supply of pressing force and welding electric current when an electric energy between the electrodes become substantially constant.

44. A method for welding together electrically conductive members, comprising the steps of:

a detecting step for detecting a removal of a thermoplastic electrically insulating member between a first electrically conductive member and a second electrically conductive member by detecting an increase in temperature of at least one of the first and second electrically conductive members, and a welding step for welding together the first electrically conductive member and the second electrically conductive member by passing electricity through said first and second conductive members to to fix said first and second conductive members to each other, after the removal of the electrically insulating member therebetween is detected in said detecting step.

* * * * *